United States Patent [19]

Shibata et al.

[11] Patent Number: 5,929,858
[45] Date of Patent: Jul. 27, 1999

[54] DEVICE FOR AIDING ANALYSIS OF INFEASIBLE SOLUTION AND UNBOUNDED SOLUTION

[75] Inventors: Akiko Shibata; Tomoaki Miyazaki; Tetsuya Kanezashi, all of Kawasaki, Japan

[73] Assignee: Fujitsu Limited, Kawasaki, Japan

[21] Appl. No.: 08/552,126

[22] Filed: Nov. 2, 1995

[30] Foreign Application Priority Data

Apr. 4, 1995 [JP] Japan .................................. 7-078875

[51] Int. Cl.⁶ .................................................. G06F 17/10
[52] U.S. Cl. ................................................................ 345/418
[58] Field of Search .......................... 395/118, 766–768, 395/790, 50, 602; 345/418, 440

[56] References Cited

U.S. PATENT DOCUMENTS

| | | | |
|---|---|---|---|
| 5,167,012 | 11/1992 | Hayes et al. .............................. | 706/60 |
| 5,388,192 | 2/1995 | Ohsawa et al. .......................... | 345/435 |
| 5,408,594 | 4/1995 | Johnson et al. .......................... | 345/433 |
| 5,530,707 | 6/1996 | Lin .......................................... | 371/43.4 |
| 5,608,859 | 3/1997 | Taguchi .................................... | 345/502 |
| 5,615,325 | 3/1997 | Peden ...................................... | 345/326 |

OTHER PUBLICATIONS

Thorell et al., Using Color Effectively, pp. 72–75, 93–95, 152, 1990.
Hillier et al., Operations Research, pp. 16, 59–60, 70–72, 1976.

*Primary Examiner*—Anton Fetting
*Attorney, Agent, or Firm*—Staas & Halsey LLP

[57] ABSTRACT

A device and method aid in an analysis of a cause of one of an infeasible solution and an unbounded solution when mathematical programming fails to find an optimal solution for a model. A display unit has a display on which a process flow is created by a user determining a configuration of elements for the model, and an output unit for displaying the process flow on the display such that at least one of the elements causing one of infeasible solution and unbounded solution is distinctive from the rest of the elements.

47 Claims, 26 Drawing Sheets

FIG. 2

```
*** Rows Section ***
 R0000001   .GLOBALSUM(PROFIT).T(1)
 R0000002   .GLOBALSUM(PROFIT)
 R0000003   .OBJECTIVE
 R0000004   .FIGURESUM(PROFIT)
 R0000005   .FIGURESUM(PROFIT) T(1)
 R0000006   .FIGURESUM(TOTALVAL).T(1)
 R0000007   .FIGURESUM(TOTALVAL)
 R0000008   .PRODUCT(L1).T(1)
 R0000009   .INPUT(L1)
 R0000010   .PRODUCT(L2).T(1)
 R0000011   .INPUT(L2)
 R0000012   .PRODUCT(L3).T(1)
 R0000013   .INPUT(L3)
 R0000014   .CONSUME(L9).T(1)
 R0000015   .OUTPUT(L9)

*** Columns Section ***
 C0000001   .GLOBALSUM(PROFIT).T(1)
 C0000002   .GLOBALSUM(PROFIT)
 C0000003   .FIGURESUM(PROFIT)
 C0000004   .FIGURESUM(PROFIT).T(1)
 C0000005   .FIGURESUM(TOTALVAL).T(1)
 C0000006   .FIGURESUM(TOTALVAL)
 C0000007   .INPUT(L1).T(1)          (*)
 C0000008   .INPUT(L1)
 C0000009   .INPUT(L2).T(1)
 C0000010   .INPUT(L2)
 C0000011   .INPUT(L3).T(1)
 C0000012   .INPUT(L3)
 C0000013   .OUTPUT(L9).T(1)
 C0000014   .OUTPUT(L9)
 C0000015   .OUTPUT(L10).T(1)
```

FIG.3

```
[R0000013].INPUT(L3)
  1.00000e++00 [00000011].INPUT(L3).T(1)    [UPPER BOUND 200.00000,LOWER BOUND 100.00000]
 -1.00000e++00 [00000012].INPUT(L3).        [UPPER BOUND infinity ,LOWER BOUND   0.00000] = 0.00000
(*)[R0000014].CONSUME(L9).T(1)
 -1.00000e++00 [00000013].OUTPUT(L9).T(1)   [UPPER BOUND infinity ,LOWER BOUND  50.00000]
  1.00000e++00 [00000012].(L9). T(1)        [UPPER BOUND infinity ,LOWER BOUND   0.00000] = 0.00000
[R0000015].OUTPUT(L9)
  1.00000e++00 [00000013].OUTPUT(L9).T(1)   [UPPER BOUND infinity ,LOWER BOUND  50.00000]
 -1.00000e++00 [00000014].OUTPUT(L9).       [UPPER BOUND infinity ,LOWER BOUND   0.00000] = 0.00000
...
```

FIG.6

650 VALUE SETTING TABLE

INPUT-INFORMATION TABLE FOR DEVICE B1

| INPUT ELEMENT | ........ | UPPER BOUND | LOWER BOUND | ACTIVITY | ........ |
|---|---|---|---|---|---|
| L1 | | | 10 | | |
| L2 | | 300 | 30 | | |
| ⋮ | | | | | |

OUTPUT-INFORMATION TABLE FOR DEVICE B1

| OUTPUT ELEMENT | ........ | UPPER BOUND | LOWER BOUND | ACTIVITY | ........ |
|---|---|---|---|---|---|
| L5 | | | 30 | | |
| ⋮ | | | | | |

⋮

FIG. 8A optimal solution <u>210.000000</u> has been obtained
                         a

FIG. 8B infeasible solution has been obtained
infeasible row = <u>12</u> name = <u>R0000012</u> , base = <u>12</u> name = <u>R0000012</u>
infeasible row = <u>18</u> name = <u>R0000018</u> , base = <u>18</u> name = <u>R0000018</u>
infeasible row = <u>21</u> name = <u>R0000032</u> , base = <u>32</u> name = <u>R0000032</u>
                 b            c                d          e

FIG. 8C unbounded solution has been obtained
unbounded valiable = <u>5</u> name = <u>C0000005</u>
                     f               g

| VARIABLE NAME | UPPER BOUND | LOWER BOUND | PATH NAME |
|---|---|---|---|
| 1:C0000001 | . | . | .GLOBALSUM(PROFIT).T(1) |
| 2:C0000002 | . | . | .GLOBALSUM(PROFIT) |
| 3:C0000003 | . | . | .FIGURESUM(PROFIT) |
| 4:C0000004 | . | . | .FIGURESUM(PROFIT).T(1) |
| 5:C0000005 | . | . | .FIGURESUM(TOTALVAL).T(1) |
| 6:C0000006 | . | . | .FIGURESUM(TOTALVAL) |
| 7:C0000007 | . | 400. | .INPUT(L1).T(1) |
| 8:C0000008 | . | 0. | .INPUT(L1) |

SOLUTION ACCESSING WINDOW

FILE OUTPUT   SELECTING ITEM   END

PATH NAME

FIG. 12

| NO. | VARIABLE NAME | UPPER BOUND | LOWER BOUND | ACTIVITY | PATH NAME |
|---|---|---|---|---|---|
| 1 | R0000001 | 0.000000 | 0.000000 | 0.000000 | .GLOBALSUM(PROFIT).T(1) |
| 2 | R0000002 | 0.000000 | 0.000000 | 0.000000 | .GLOBALSUM(PROFIT) |
| 3 | R0000003 | none | none | 2357.543887 | .OBJECTIVE |
| 4 | R0000004 | 0.000000 | 0.000000 | 0.000000 | .FIGURESUM(PROFIT) |
| 5 | R0000005 | 0.000000 | 0.000000 | 0.000000 | .FIGURESUM(PROFIT).T(1) |
| 6 | R0000006 | 0.000000 | 0.000000 | 0.000000 | .FIGURESUM(TOTALVAL).T(1) |
| 7 | R0000007 | 0.000000 | 0.000000 | 0.000000 | .FIGURESUM(TOTALVAL) |
| 8 | R0000008 | 0.000000 | 0.000000 | 0.000000 | .PRODUCT(L1).T(1) |
| 9 | R0000009 | 0.000000 | 0.000000 | 0.000000 | .INPUT(L1) |
| 10 | R0000010 | 0.000000 | 0.000000 | 0.000000 | .PRODUCT(L2).T(1) |
| 11 | R0000011 | 0.000000 | 0.000000 | 0.000000 | .INPUT(L2) |
| 12 | R0000012 | 0.000000 | 0.000000 | 0.000000 | .PRODUCT(L3).T(1) |
| 13 | R0000013 | 0.000000 | 0.000000 | 0.000000 | .INPUT(L3) |
| 14 | R0000014 | 0.000000 | 0.000000 | 0.000000 | .CONSUME(L9).T(1) |
| 15 | R0000015 | 0.000000 | 0.000000 | 0.000000 | .OUTPUT(L9) |
| ⋮ | ⋮ | ⋮ | ⋮ | ⋮ | ⋮ |
| 138 | C0000001 | none | none | 2357.543887 | .GLOBALSUM(PROFIT).T(1) |
| 139 | C0000002 | none | none | 2357.543887 | .GLOBALSUM(PROFIT) |
| 140 | C0000003 | none | none | 2357.543887 | .FIGURESUM(PROFIT) |
| 141 | C0000004 | none | none | 2357.543887 | .FIGURESUM(PROFIT).T(1) |
| 142 | C0000005 | none | none | 1899.419582 | .FIGURESUM(TOTALVAL).T(1) |
| 143 | C0000006 | none | none | 1899.419582 | .FIGURESUM(TOTALVAL) |
| 144 | C0000007 | none | 400.000000 | 507.738905 | .INPUT(L1).T(1) |
| 145 | C0000008 | none | 0.000000 | 507.738905 | .INPUT(L1) |
| 146 | C0000009 | 400.000000 | 100.000000 | 392.261095 | .INPUT(L2).T(1) |
| 147 | C0000010 | none | 0.000000 | 392.261095 | .INPUT(L2) |
| 148 | C0000011 | 200.000000 | 100.000000 | 100.000000 | .INPUT(L3).T(1) |
| 149 | C0000012 | none | 0.000000 | 100.000000 | .INPUT(L3) |
| 150 | C0000013 | 50.000000 | none | 49.500000 | .OUTPUT(L9).(P1) |
| 151 | C0000014 | none | 0.000000 | 49.500000 | .OUTPUT(L9) |
| 152 | C0000015 | 120.000000 | 90.000000 | 90.000000 | .OUTPUT(L10).T(1) |
| ⋮ | ⋮ | ⋮ | ⋮ | ⋮ | ⋮ |

FIG. 16

|  | ... | UPPER BOUND | LOWER BOUND | ACTIVITY | ... |
|---|---|---|---|---|---|
| L9 |  |  | 50 | 49.5 |  |
| L10 |  | 120 | 90 | 90. |  |
| L7 |  | 150 | 100 | 149.2169 |  |
| L11 |  | 250 | 200 | 200 |  |
| ⋮ | ⋮ | ⋮ | ⋮ | ⋮ | ⋮ |

FIG.17A optimal solution 210.00000 has been obtained

FIG.17B infeasible solution has been obtained
infeasible row = 12 name = R0000012 , base =12 name =R0000012 ⎫
infeasible row = 18 name = R0000018 , base =18 name =R0000018 ⎬ a
infeasible row = 21 name = R0000032 , base =32 name =R0000032 ⎭

*** [VARIABLE NAME] ******** PATH NAME **********
(1) [ R0000012 ] .PRODUCT (L3). T(1)                                       b
(2) [ R0000018 ] .PRODUCT (L5). T(1)
(3) [ R0000032 ] .CONSUME (L7). T(2)
        c              d

FIG.17C unbounded solution has been obtained
unbounded valiable = 5 name = C0000005                                    e

*** [VARIABLE NAME] *********PATH NAME ********    f
(1) [ C0000005 ] .INPUT(L3).T(1)
     g         h

FIG.18 infeasible solution has been obtained
  infeasible row = 52 name = R0000052 , base = 52 name = R0000052   a \*\*\*\*\*[VARIABLE NAME]\*\*\*\*\*\*\*\*\*\*\*\*\*\*\* PATH NAME \*\*\*\*\*\*\*\*\*\*  b
(1)  [ <u>R0000052</u> ]   <u>.C.CB.CONSUME(LC3). T(1)</u>
          c              d

FIG.19 infeasible solution has been obtained
  infeasible row = 52 name = R0000052 , base = 52 name = R0000052   a \*\*\*\*\*[VARIABLE NAME]\*\*\*\*\*\*\*\*\*\*\*\*\*\*\* DESCRIPTION \*\*\*\*\*\*\*\*\*\*\*\*\*\*\*\*\*\*  b (1)  [ <u>R0000052</u> ]  "Consumption amount in the first period on the
        c               line LC3 of the third layer,
                      which belongs to a box CB of the second layer,
                      which belongs to a box C of the first layer"
                      d

SOLUTION ACCESSING WINDOW

( FILE OUTPUT ) ( SELECTING ITEM ) ( SOLUTION-DISPLAY ) ( END )

631

PATH NAME

| VARIABLE NAME | UPPER BOUND | LOWER BOUND | PATH NAME |
|---|---|---|---|
| 1:C0000001 | . | . | .GLOBALSUM(PROFIT).T(1) |
| 2:C0000002 | . | . | .GLOBALSUM(PROFIT) |
| 3:C0000003 | . | . | .FIGURESUM(PROFIT) |
| 4:C0000004 | . | . | .FIGURESUM(PROFIT).T(1) |
| 5:C0000005 | . | . | .FIGURESUM(TOTALVAL).T(1) |
| 6:C0000006 | . | . | .FIGURESUM(TOTALVAL) |
| 7:C0000007 | . | 400. | .INPUT(L1).T(1) |
| 8:C0000008 | . | 0. | .INPUT(L1) |

FIG.23B

CLICK ↓ ( SOLUTION-DISPLAY ) ↑ CLICK

SOLUTION ACCESSING WINDOW

( FILE OUTPUT ) ( SELECTING ITEM ) ( SOLUTION-DISPLAY ) ( END )

631

PATH NAME

INFEASIBLE/UNBOUNDED SOLUTION INFORMATION

| R0000012 | .PRODUCT(L3).T(1) |
| R0000018 | .PRODUCT(L5).T(1) |
| R0000032 | .PRODUCT(L7).T(2) |

DEVICE FOR AIDING ANALYSIS OF INFEASIBLE SOLUTION AND UNBOUNDED SOLUTION

BACKGROUND OF THE INVENTION

1. Field of the Invention

The present invention generally relates to devices for aiding an analysis of infeasible solutions and unbounded solutions and, particularly, relates to a device for aiding an analysis of infeasible solutions and unbounded solutions. The device is used for finding a cause of the infeasible solutions and unbounded solutions in mathematical programming.

More particularly, the present invention relates to a device using a GUI (graphical user interface) for aiding in an analysis of infeasible solutions and unbounded solutions which are obtained through an optimization of a mathematical programming system, when the mathematical programming is applied to the designing of a production plan and an operation plan for petroleum plants, chemical plants, and the like.

2. Description of the Related Art

In order to find a cause of infeasible solutions and unbounded solutions, GUI is used to provide a user interface between an operator and a computer, through which graphical components such as pull-down menus, windows, icons, etc., are manipulated by using a pointing device. In general, the cause of infeasible solutions and unbounded solutions is found by using information displayed through GUI by following the procedure detailed below:

Step 1) identifying variables causing the infeasible solutions and the unbounded solutions;

Step 2) checking whether appropriate data is set for these variables;

Step 3) correcting the data if it is not appropriate.

In general, a modeling system which is used for generating model data of mathematical programing has an advantage in that a generation of process flows and data entry can be conducted without taking into account a formulation of the mathematical programming. In such a modeling system, the model data is generated automatically without an attention being paid to each variable name. Thus, when infeasible solutions and unbounded solutions are obtained, it takes time to determine which part of the process flow corresponds to the variables of the cause of the infeasible and unbounded solutions.

Accordingly, it is expected that information regarding which part of the process flow corresponds to which variable name of the model data will be provided to the user, when the modeling system is used.

In the following, a process of obtaining an optimal solution used in various programming methods will be described.

FIG. 1 is a block diagram of a system for aiding an analysis. The system shown in the figure includes a modeling system 100, a variable-map file 200, a model-data file 300, a solution-information file 400, a mathematical-programming system 500, a display device 600, and a model-generation-information file 900.

In general, the modeling system 100 can express an accurate mathematical-programming model by using given data, and is capable of incorporating new data which are not used in initial modeling. In an example of FIG. 1, the modeling system 100 generates the variable-map file 200, the model-data file 300, and the model-generation-information file 900. The modeling system 100 shows operation results calculated by the mathematical-programming system 500 to the user through the display device 600.

The variable-map file 200 contains variable names of the model data generated by the modeling system 100, and contains path names representing which parts of the process flow correspond to which variable names.

FIG. 2 is a chart showing an example of the variable map. The variable map contains variable names automatically given by the modeling system 100 and the path names representing which parts of the process flow correspond to which variable names. In FIG. 2, the variable names starting with "R" refer to row-variable names, and variable names starting with "C" refer to column-variable names. In the columns section of FIG. 2, the row indicated by (*) means that a variable C0000007, named by the modeling system, represents input data of a first period on a line L1 of the process flow.

The model-data file 300 stores the model data generated by the modeling system 100.

The solution-information file 400 contains information on a solution which is obtained through optimization by the mathematical-programming system 500. The information on a solution is written in the solution-information file 400 not only when an optimum solution is obtained through the optimization but also when a infeasible solution or a unbounded solution is obtained.

The model-generation-information file 900 is a file in which detailed information on each variable is written when the modeling system 100 generates the model data.

FIG. 3 is a chart showing an example of the model-generation-information file. The part indicated by (*) in FIG. 3 means that an expression R0000014 represents an amount of consumption of the first period on a line L9 of the process flow, and that a difference between a variable C0000013 and a variable C0000033 is zero, i.e., an output amount from a device on the line L9 is the same in the first period as the output amount of the line L9 from the entire process flow. Also, an upper bound and a lower bound which are set for the variables C0000013 and C0000033 are written in the model-generation-information file 900.

A method by which the mathematical-programming system 500 determines if a solution is infeasible or unbounded will be described below. When the solution cannot satisfy all constraints, the solution is found infeasible. When the constraints are not enough to obtain a bounded solution such that an absolute value of an objective function can be as large as possible, the solution is unbounded.

A method of the determination when the simplex method is used as an optimization method will be described. The simplex method searches for a node at which the objective function becomes the largest or the smallest, while moving from a node to a node which is made up by the constraints. For example, the nodes are apexes of a n-dimensional polyhedron when n constraints are imposed. Here, the movement from node to node is accomplished by using mathematical matrix operations.

An infeasible solution in the simplex method is a solution at a node where a sum of the amounts which do not satisfy the constraints increases or does not change for a search in any direction. That is, the infeasible solution is a solution when this sum does not decrease. An unbounded solution is a solution at a node where an absolute value of the objective function can become infinitely large while satisfying the constraints. For example, when the objective function is to be maximized, the unbounded solution is a solution when a variable which has a positive coefficient and can become infinitely large is found.

The display device 600 displays various information which is used for obtaining records and end results of an optimization process carried out by the mathematical-programming system 500. For example, types of displays for showing the information include an output-information-display window, a solution accessing window, and an infeasible/unbounded-solution-display window.

FIG. 4 is an illustrative drawing for showing an example of the display of the related art. In the figure, a process-flow window 610, a output-information-display window 620, a solution accessing window 630, and a value setting table 650 are shown. The process-flow window 610 is used by the user for determining the process flow and configuration of devices (processing elements). The output-information-display window 620 is used for displaying the record of the optimization process. The solution accessing window 630 is used for displaying the end result of the optimization process. These windows are displayed when the user selects them by using a pointing device.

In the process-flow window 610, the user by using the pointing device enters lines (L1 through L12 in the example of FIG. 4) representing flows of various elements and boxes (B1 through B4) representing devices for processing these elements.

FIG. 5 is an illustrative drawing showing the process-flow window 610 in more detail. At the bottom of the process-flow window 610, a result-display field 611 is provided. The result-display field 611 is used for displaying a value of the objective function and a condition of the solution as to whether it is an optimal solution, an infeasible solution, or a unbounded solution, obtained through the optimization process.

The output-information-display window 620 displays a record on the model-data generation which is conducted by the modeling system 100 for the mathematical programming, a record on an operation of the mathematical-programming system 500, and a record on a process of the modeling system 100 obtaining the solution information of the mathematical-programming system 500.

The solution accessing window 630 displays the solution obtained by the mathematical-programming system 500 by reading it from the solution-information file 400.

The value setting table 650 is used for setting the upper bound and the lower bound for input/output values of each device (e.g., B1 through B4) and the entire process flow, and for setting various conditions and the like which are necessary for the optimization process. The setting is conducted for each of the devices or for the entire process flow. Also, in the value setting table 650, solutions obtained by the mathematical-programming system 500 can be displayed for each data entry.

FIG. 6 is a chart showing an example of the value setting table. The example of FIG. 6 shows value setting tables for setting input/output data for the device B1. An upper table is an input-data table for the device B1, and the lower table is an output-data table for the device B1. Columns of the upper bound and the lower bound are used by the user for entering values, and an activity column is used for displaying solutions obtained through the optimization process by the mathematical-programming system 500.

FIG. 7 is a flowchart of a process of an analysis aiding system of the related art, and is used for explaining an operation of the system of FIG. 1.

At a step S101, a process flow is created by the user on the display device 600 using the modeling system 100.

At a step S102, conditions are entered by the user in the value setting table 650 using the modeling system 100. Here, examples of these conditions, which are required by the mathematical-programming system 500, include a condition on an amount of procured supplies as to the number of tons of supplies necessary, a condition on the yield as to what percentage of the yield must be maintained on average in factory production, etc. These conditions can be set for each of the devices or the entire process flow.

At a step S103, the modeling system 100 generates the model data, and provides variable names in an order. Also, the modeling system 100 stores in the variable-map file 200 these variable names along with the path names indicating which parts of the process flow correspond to these variable names.

At a step S104, the modeling system 100 stores in the model-generation-information file 900 the detailed information on the expressions and the variables regarding the generating process of the model data.

At a step S105, the modeling system 100 stores the model data in the model-data file 300.

At a step S106, the mathematical-programming system 500 reads the model data from the model-data file 300, carries out the optimization process, and stores the solutions in the solution-information file 400.

At a step S107, the modeling system 100 accesses the solution-information file 400 to obtain the solution condition by reading the result of the optimization process of the mathematical-programming system 500.

At a step S108, the modeling system 100 displays the result of the optimization process in the process-flow window 610 on the display device 600.

At a step S109, the modeling system 100 displays the result of the optimization process in the value setting table 650 on the display device 600.

At a step S110, a check is made whether the solution is one of the infeasible solution and the unbounded solution. When the solution is one of the infeasible solution and the unbounded solution, this determination is displayed as the solution condition in the result-display field 611 of the process-flow window 610. or the determination can be shown in the record on the operation of the mathematical-programming system 500, which record is displayed in the output-information-display window 620. When the solution is one of the infeasible solution and the unbounded solution, the procedure goes to a step S111. Otherwise, the procedure ends at this point.

At a step S111, the user looks up in the output-information-display window 620 the variable names of the variables causing the infeasible solution or the unbounded solution.

FIGS. 8A through 8C are illustrative drawings showing examples of the output-information-display window 620. FIG. 8A shows an example in which an optimal solution is obtained with a value of the objective function being "210.00000".

FIG. 8B shows an example in which an infeasible solution is caused by variables R0000012, R0000018, and R0000032. In FIG. 8B, a column b indicates row-variable numbers of the variables of the cause, a column c indicates row-variable names of the variables of the cause, a column d indicates variable numbers in the base at rows causing the infeasible solution, and a column e indicates variable names in the base at rows causing the infeasible solution.

FIG. 8C show an example in which an unbounded solution is caused by a variable C0000005. In FIG. 8C, a column f indicates variable numbers of the variables causing the unbounded solution, and a column g indicates variable names of the variables of the cause.

At a step S112, the user looks up the variable-map file 200, the model-generation-information file 900, or the solution accessing window 630 to determine, based on the path names, which parts of the process flow correspond to the variables of the cause. For example, when a variable R0000009 shown in the output-information-display window 620 is the cause of the infeasible solution, the user looks up the variable-map file 200 to pick up a path name ".INPUT (L1)" corresponding to the variable R0000009. By doing so, the user can know that an input amount on the line L1 of the process flow is the cause of the infeasible solution.

When the model-generation-information file 900 as shown in FIG. 3 is looked up, for example, the detailed information regarding the generation of the expression R0000014 is searched for and obtained. By doing so, the user can know that the expression R0000014 is comprised of the variables C0000013 and C0000033 and that these variables are the causes of the infeasible solution.

When the solution accessing window 630 as shown in FIG. 9 is looked up and the variable C0000007 is known to be a cause of an unbounded solution, for example, a path name ".INPUT(L1).T1" of the variable C0000007 is searched for and obtained in the solution accessing window 630. By doing so, the user can know that an input amount in the first period on the line L1 of the process flow is the cause of the unbounded solution.

In this manner, the user extracts elements causing an infeasible solution and an unbounded solution, and analyzes these elements.

However, in the former technique, the user is required to determine, based on the path names, which elements of the process flow correspond to the variables causing an infeasible solution or an unbounded solution. The user has to do this by looking up the variable-map file or the solution accessing window based on the variable names of the causes, wherein the variable names are obtained from the information generated by the mathematical-programming system. Thus, although the modeling system is expected to allow users to design the mathematical programming without having to pay attention to its formulation, the user has to start the analysis from the model data automatically generated by the modeling system.

Thus, the user has to follow the procedure as described above in order to find the cause of the infeasible solution or the unbounded solution, so that the work load on the user is excessively large.

Accordingly, there is a need for an analysis aiding device which can provide a user with information easy to understand and useful for analyzing an infeasible solution or an unbounded solution obtained through the optimization process.

Also, there is a need for an analysis adding device which can enhance elements on the process flow causing an infeasible solution or an unbounded solution by showing them in a distinctive color or in a blinking appearance.

Furthermore, there is a need for an analysis aiding device which can enhance elements causing an infeasible solution or an unbounded solution by showing them in a distinctive color or in a blinking appearance when a process flow has a hierarchical structure.

Also, there is a need for an analysis aiding device which can display variable names and path names of variables causing an infeasible solution or an unbounded solution in the solution accessing window, and can attach descriptions of path names.

Furthermore, there is a need for an analysis aiding device which can display variable names and path names of variables causing an infeasible solution or an unbounded solution in a solution-information-display window, and can attach descriptions of path names.

Also, there is a need for an analysis aiding device which allow a user to easily find the cause of an infeasible solution and an unbounded solution by simultaneously displaying the process flow and the value setting table.

SUMMARY OF THE INVENTION

Accordingly, it is a general object of the present invention to provide an analysis aiding device which can satisfy the needs described above.

It is another and more specific object of the present invention to provide an analysis aiding device which can provide a user with information easy to understand and useful for analyzing an infeasible solution or an unbounded solution obtained through the optimization process.

It is yet another object of the present invention to provide an analysis adding device which can enhance elements on the process flow causing an infeasible solution or an unbounded solution by showing them in a distinctive color or in a blinking appearance.

In order to achieve the above objects according to the present invention, a device for aiding an analysis of a cause of one of an infeasible solution and an unbounded solution when mathematical programming fails to find an optimal solution for a model includes a display unit having a display on which a process flow is created by a user determining a configuration of elements for the model, and an output unit for displaying the process flow on the display such that at least one of the elements causing the one of infeasible solution and unbounded solution is distinctive from the rest of the elements.

In this device according to the present invention, the at least one of the elements can be displayed in a distinctive color or in a blinking appearance. Thus, the device provides a user with information easy to understand and useful for analyzing an infeasible solution or an unbounded solution obtained through the optimization process.

It is still another object of the present invention to provide an analysis aiding device which can enhance elements causing an infeasible solution or an unbounded solution by showing them in a distinctive color or in a blinking appearance when a process flow has a hierarchical structure.

In order to achieve the above object according to the present invention, the output unit described above comprises means for distinctively displaying the at least one of the elements and portions which include the at least one of the elements at higher levels of the hierarchical structure.

In this device according to the present invention, the at least one of the elements and portions at the higher levels relating to the at least one of the elements can be displayed in a distinctive color or in a blinking appearance. Thus, even when the process flow has the hierarchical structure, the device provides a user with information easy to understand and useful for analyzing an infeasible solution or an unbounded solution obtained through the optimization process.

It is still yet another object of the present invention to provide an analysis aiding device which can display variable names and path names of variables causing an infeasible solution or an unbounded solution in the solution accessing window, and can attach descriptions of path names.

It is further object of the present invention to provide an analysis aiding device which can display variable names and path names of variables causing an infeasible solution or an unbounded solution in a solution-information-display window, and can attach descriptions of path names.

In order to achieve the above objects according to the present invention, the output unit comprises means for displaying a variable name corresponding to the at least one of the elements and displaying at least one of a path name of the variable name and a description of the path name, the path name representing which element corresponds to the variable name.

In this device according to the present invention, the variable name and the path name relating to the cause of the infeasible solution or the unbounded solution can be displayed, as can the description of the path name.

It is yet further object of the present invention to provide an analysis aiding device which allow a user to easily find a cause of an infeasible solution and an unbounded solution by simultaneously displaying the process flow and the value setting table.

In order to achieve the above object according to the present invention, conditions for the elements are set by the user in a value setting table shown on the display, and the output unit comprises means for displaying the value setting table such that the at least one of the elements is distinctive from a rest of the elements.

In this device according to the present invention, the value setting table can be displayed simultaneously with the process flow, in which the at least one of the elements can be displayed in a distinctive color or in a blinking manner. Thus, this device allows the user to easily find a cause of an infeasible solution and an unbounded solution.

Other objects and further features of the present invention will be apparent from the following detailed description when read in conjunction with the accompanying drawings.

BRIEF DESCRIPTION OF THE DRAWINGS

FIG. 2 is a chart showing an example of a variable-map file of FIG. 1;

FIG. 3 is a chart showing an example of a model-generation-information file of FIG. 1;

FIG. 6 is a chart showing an example of a value setting table of FIG. 4;

FIGS. 8A through 8C are illustrative drawings showing examples of an output-information-display window of FIG. 4;

FIG. 9 is an illustrative drawing showing a solution accessing window of FIG. 4;

FIG. 12 is a chart showing an example of the data stored in a solution-information file of FIG. 11;

FIG. 16 is an illustrative drawing showing an example of the value setting table;

FIGS. 17A through 17C are examples of a display (pairs of variable names and path names) in an output-information-display window of FIG. 11;

FIG. 18 is an illustrative drawing showing an example of a display (pairs of the variable names and the path names) when the process flow has a hierarchical structure;

FIG. 19 is an illustrative drawing showing an example of a display (pairs of the variable names and descriptions);

FIGS. 23A and 23B are illustrative drawings showing examples of a display on a solution accessing window of FIG. 11;

DESCRIPTION OF THE PREFERRED EMBODIMENTS

In the following, a principle and an embodiment of the present invention will be described with reference to the accompanying drawings.

Figure 10:
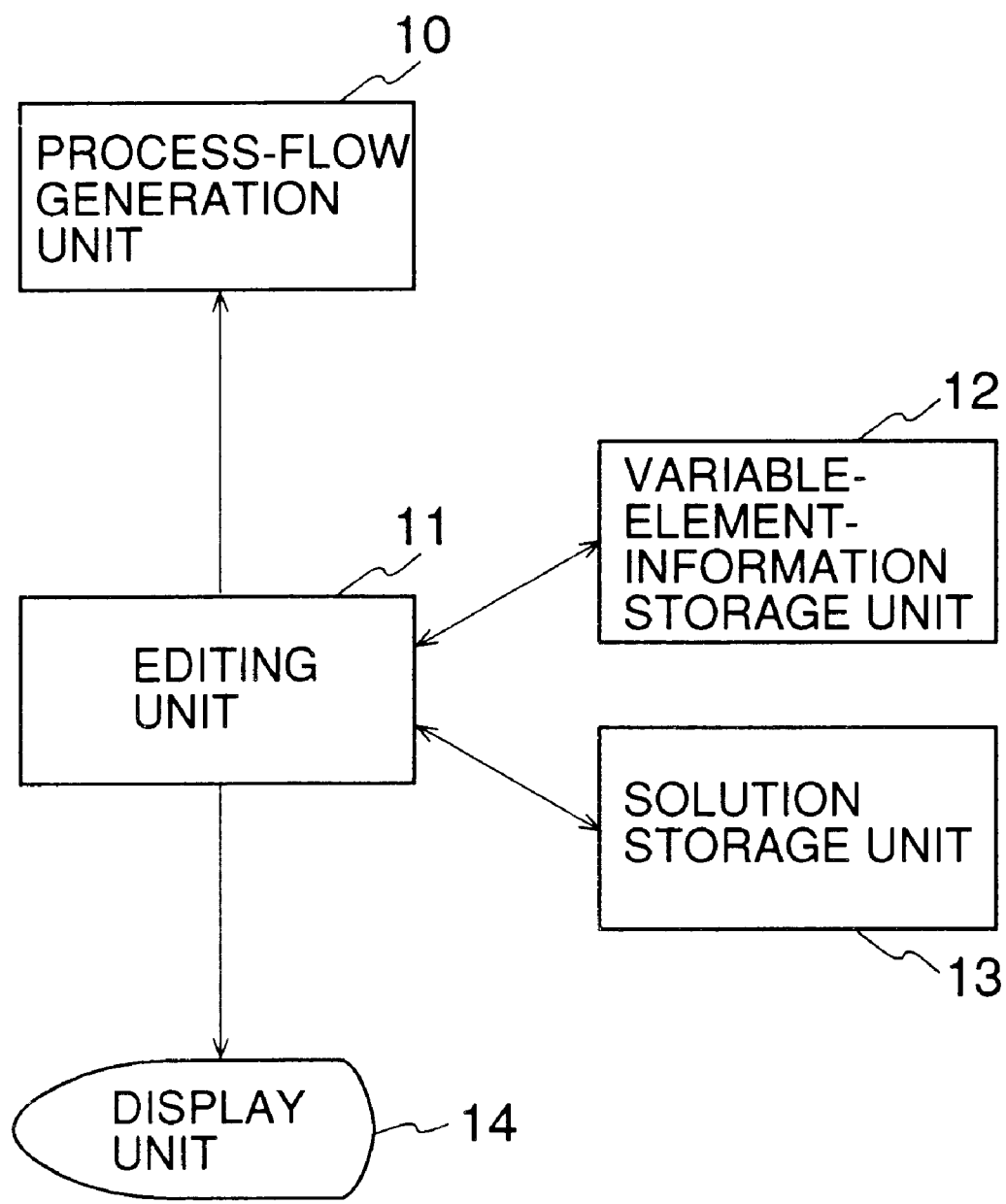
FIG. 10 is a block diagram of an analysis aiding device according to a principle of the present invention.

FIG. 10 is a block diagram of an analysis aiding device according to the principle of the present invention. The analysis aiding device of FIG. 10 includes a process-flow-generation unit 10, an editing unit 11, a variable-element-information storage unit 12, a solution storage unit 13, and a display unit 14.

The process-flow-generation unit 10 generates the process flow. The variable-element-information storage unit 12 stores pairs of a path name, describing an element, and a unique variable name corresponding to the path name, and stores detailed information on configurations determined at the time of a model-data generation using a modeling system. The solution storage unit 13 stores results of an optimization process carried out by a mathematical-programming system.

When an infeasible solution or an unbounded solution is obtained, the editing unit 11 acquires the variable names causing the infeasible solution or the unbounded solution by looking up the solution storage unit 13. Then, the editing unit 11 searches for corresponding pairs in the variable-element-information storage unit 12, and displays searched path names and the variable names on the display unit 14 after editing them in a predetermined format.

According to the principle of the present invention, when an infeasible solution or an unbounded solution is obtained, the editing unit 11 displays the cause with an distinctive appearance (or with a mark attached). Here, the infeasible solution or the unbounded solution is obtained through an optimization process of a mathematical-programming system using model data which is generated by a model system based on the process flow and numerical data entered by a user. The editing unit 11 may display the cause with a distinctive appearance in a solution accessing window, an output-information-display window, or a solution-information-display window. Then, the cause can be analyzed in the following manner.

The user can identify elements of the cause, such as boxes or lines on the process flow, since they are displayed with distinctive appearances. The user can also identify the elements of the cause on the process flow by looking at the path names displayed in the solution accessing window, the output-information-display window, or the solution-information-display window.

The user can identify the elements of the cause in the manner described above, and, then, can check on data contents so as to analyze the cause of the infeasible solution or the unbounded solution.

The editing unit 11 may also display the cause with a distinctive appearance in a value setting table. Then, this value setting table can be displayed along with the process flow. As a result, the user can identify locations of the cause in the process flow, and can learn values of the variables causing the infeasible solution or the unbounded solution in the value setting table.

In the following, an embodiment of the present invention will be described with reference to the accompanying drawings.

Figure 1:
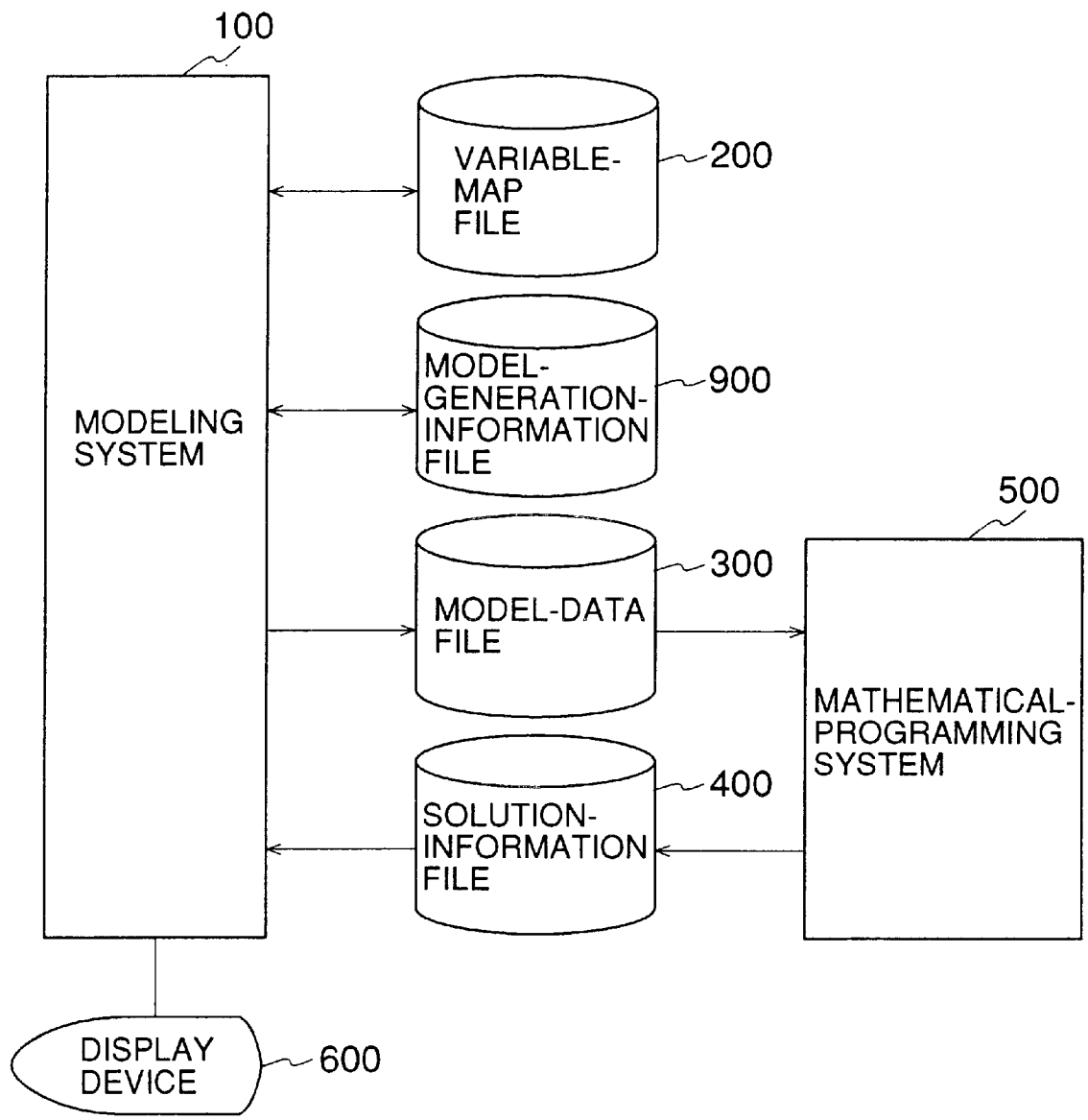
FIG. 1 is a block diagram of a system for aiding an analysis.
Figure 4:
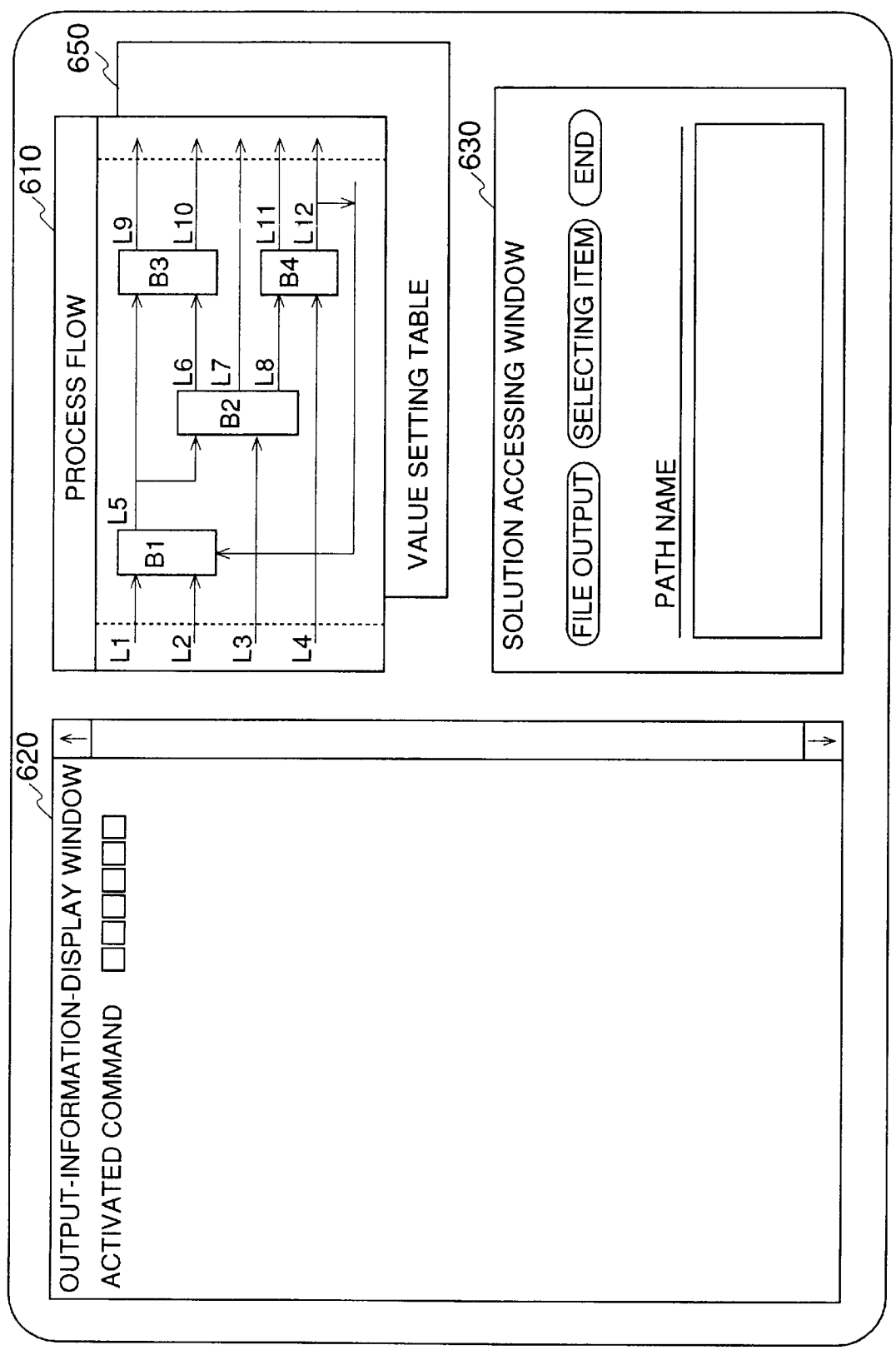
FIG. 4 is an illustrative drawing for showing an example of a display of FIG. 1.
Figure 5:
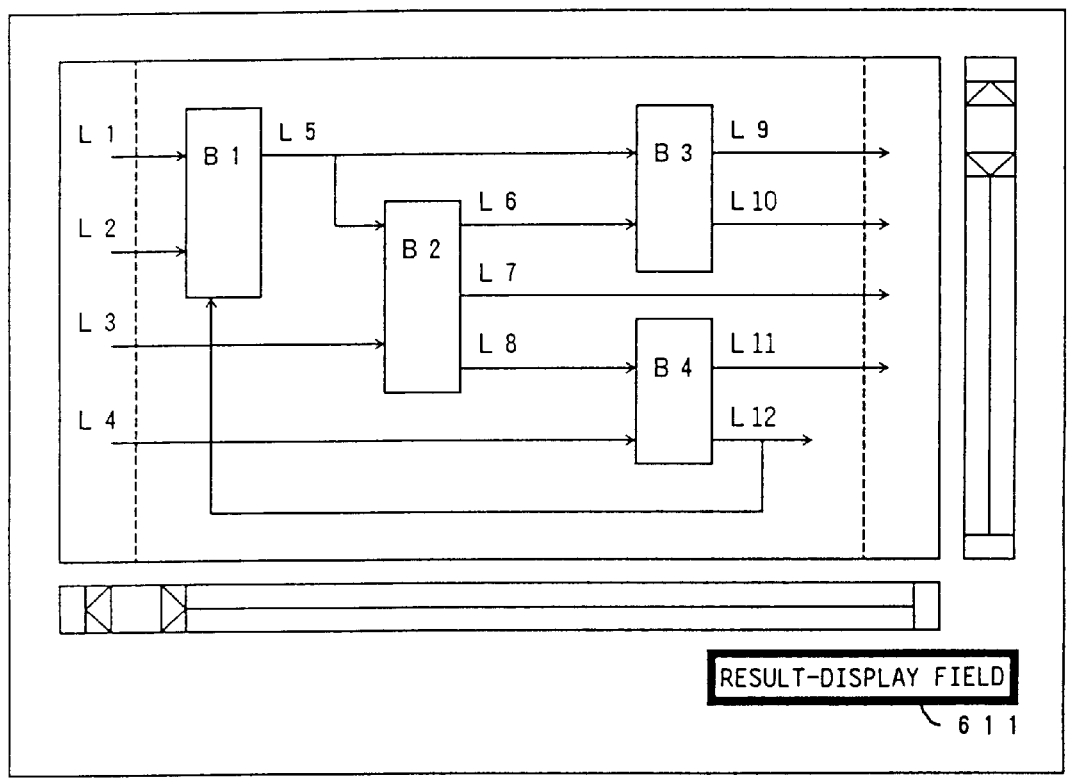
FIG. 5 is an illustrative drawing showing a process-flow window of FIG. 4 in more detail.
Figure 7:
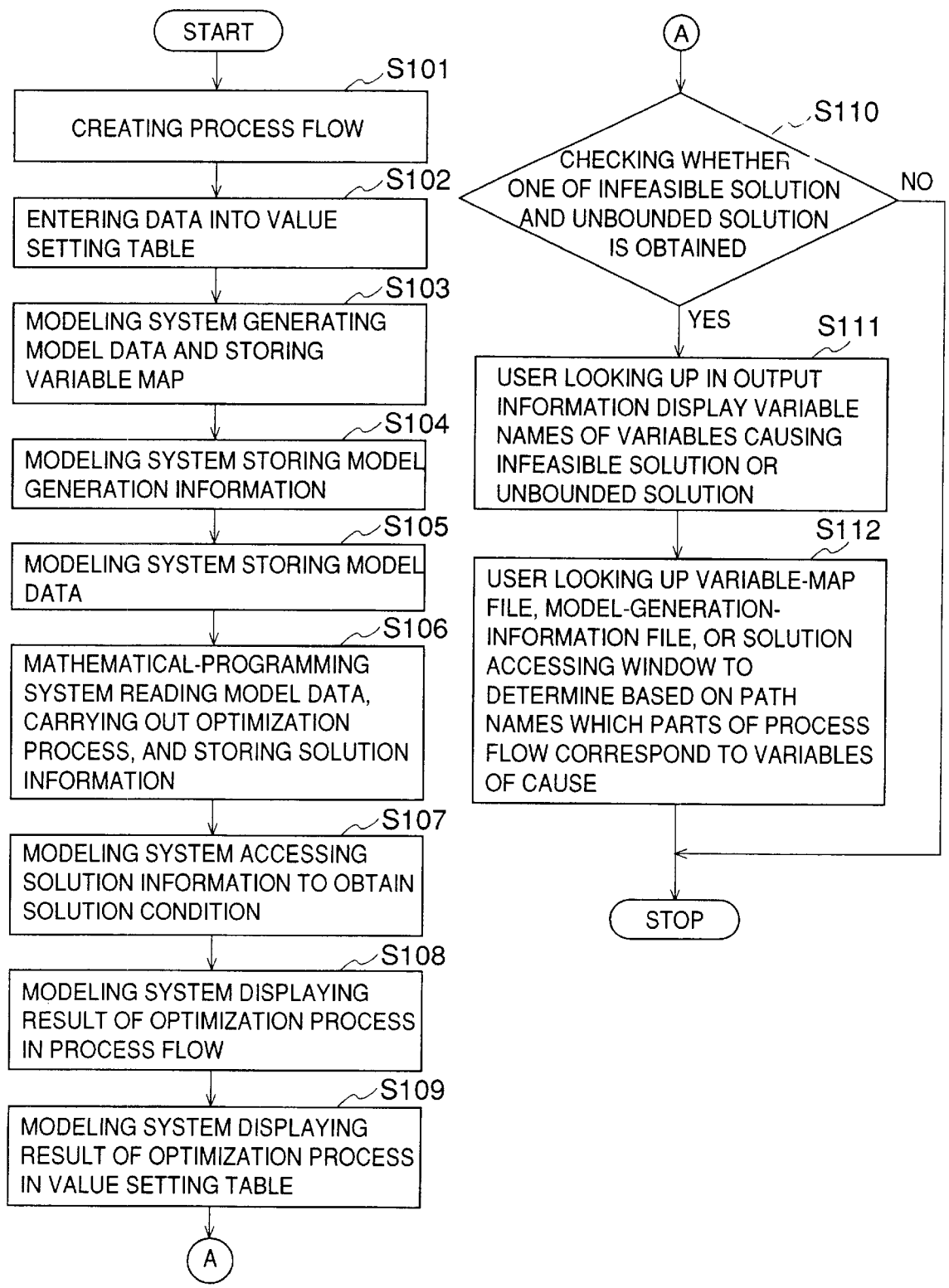
FIG. 7 is a flowchart of a process of an analysis aiding system of FIG. 1.
Figure 11:
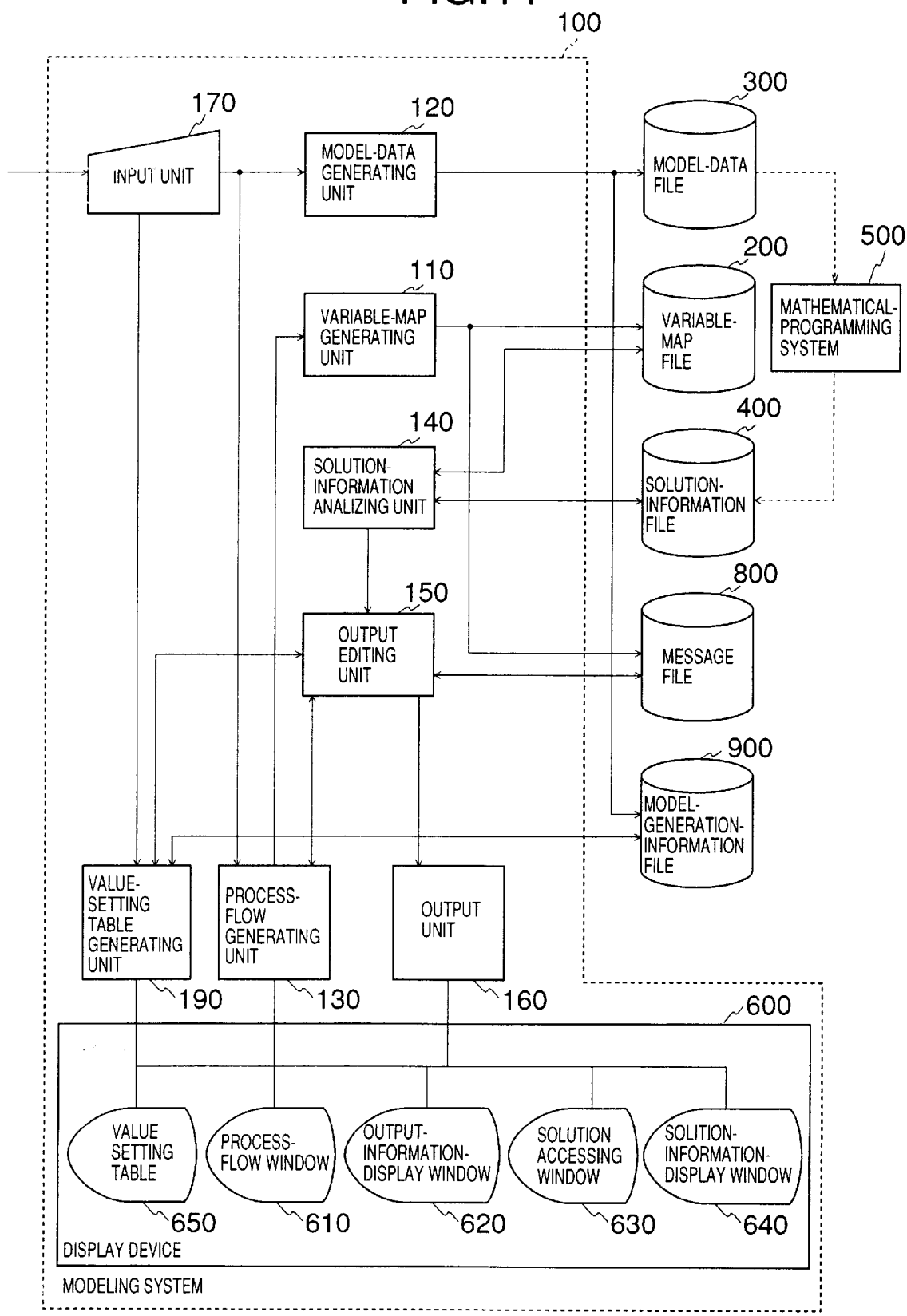
FIG. 11 is a block diagram of an analysis aiding device according to an embodiment of the present invention.

FIG. 11 is a block diagram of an analysis aiding device according to the embodiment of the present invention. This analysis aiding device may be implemented as a computer system. In FIG. 11, the same elements as those of FIG. 1 are referred to by the same numerals, and a description thereof will be omitted.

The modeling system 100 includes a variable-map generating unit 110, a model-data generating unit 120, a process-flow generating unit 130, a solution-information analyzing unit 140, an output editing unit 150, an output unit 160, an input unit 170, a value-setting-table generating unit 190, and the display device 600. A message file 800 along with the variable-map file 200, the model-data file 300, the solution-information file 400, and the model-generation-information file 900 are provided for access from these elements of the modeling system 100.

The display device 600 includes the process-flow window 610, the output-information-display window 620, the solution accessing window 630, a solution-information-display window 640, and the value setting table 650.

The variable-map generating unit 110 generates the variable-map file 200 in the same manner as in the related art. Contents of the variable-map file 200 are the same as those shown in FIG. 2, and, thus, a description thereof will be omitted. The variable-map generating unit 110 generates the message file 800 at the same time as the generation of the variable-map file 200. That is, the variable-map generating unit 110 generates messages (descriptions) regarding information (path names) indicating which elements of the process flow correspond to which variable, and stores the messages as pairs with the path names in the message file 800.

For example, if the path name is ".INPUT(L1).T1", the words such as "input amount", "L1", and "first period" are registered word by word in the message file 800, and a description (sentence) is formed at the time of editing. Instead, a sentence "an input amount in the first period on the line L1" may be stored in the message file 800 as a description for the path name ".INPUT(L1).T1".

The model-data generating unit 120 generates the model data in the same manner as in the related art, based on the process flow and the numerical data (value setting table) which are generated from the data entered by the user using the input unit 170. Then, the model-data generating unit 120 stores the model data in the model-data file 300. Also, the model-data generating unit 120 stores the detailed information on each variable in the model-generation-information file 900. Contents of the model-generation-information file 900 are the same as those shown in FIG. 3, and, thus, a description thereof will be omitted.

The process-flow generating unit 130 receives information indicating the devices or the lines from the user using the input unit 170, and, then, sets this information in the process-flow window 610. Also, the process-flow generating unit 130 instructs the output editing unit 150 to edit the variable names, the path names, the descriptions, etc., based on the result of the optimization process obtained by the mathematical-programming system 500.

The solution-information analyzing unit 140 analyzes the result of the optimization process stored in the solution-information file 400. Here, the solution-information file 400 contains the variable names, the upper bounds, the lower bounds, the activities, and the path names.

FIG. 12 is a chart showing an example of the data stored in the solution-information file 400 according to the embodiment of the present invention. The example of FIG. 12 shows contents of the solution-information file 400, which are output at the end of the optimization process and include at least the pairs of the variable names and the corresponding path names.

In FIG. 12, the word "none" which appears in a column for the upper bounds or the lower bounds indicates that there is no entry of the upper bounds or the lower bounds by the user. The activities which belong to the variables or the expressions are values obtained through the optimization process. The activities are shown in an activity column as shown in FIG. 12. In FIG. 12, at row number 3 is shown information on the objective function which is obtained through the optimization process of the mathematical-programming system 500.

Upon acquiring analysis information from the solution-information analyzing unit 140, the output editing unit 150 edits the variable names, the path names, the descriptions, etc., based on the analysis information in an appropriate format for the output-information-display window 620, the solution accessing window 630, or the solution-information-display window 640. Also, the output editing unit 150 carries out an editing process to display the elements in the process-flow window 610 with distinctive appearances, which elements correspond to the variables causing an infeasible solution or an unbounded solution. Then, the output editing unit 150 sends the edited information to the output unit 160 along with a format edited in the process-flow generating unit 130.

The output editing unit 150 carries out an editing process to display positions in the value setting table 650 of the variables causing the infeasible solution or the unbounded solution. Then, the output editing unit 150 sends the edited information to the output unit 160 along with a format edited in the value-setting-table generating unit 190. Also, the output editing unit 150 transfers the data handed from the solution-information analyzing unit 140 to a transmission destination. The transmission destination includes the value-setting-table generating unit 190, the process-flow generating unit 130, and the output unit 160.

The output unit 160 sends the edited information formed in the output editing unit 150 to an appropriate one of the output-information-display window 620, the solution accessing window 630, and the solution-information-display window 640.

When the input information to be set in the value setting table 650 is entered by the user using the input unit 170, the value-setting-table generating unit 190 sets the input information in the value setting table 650. Also, the value-setting-table generating unit 190 instructs the output editing unit 150 to edit the variable names, the path names, the descriptions, etc., based on the result of the optimization process obtained by the mathematical-programming system 500.

The display device 600 displays the process-flow window 610, the output-information-display window 620, the solution accessing window 630, the solution-information-display window 640, and the value setting table 650 under the control of the output unit 160. The display device 600 can display any one of these windows at a time and, also, can display a plurality of these windows at a time.

The input unit 170 is used by the user to enter instructions, such as selecting a window to be displayed, the pointing information for the process-flow window 610, the input information for the value setting table 650, etc.

Figure 13:
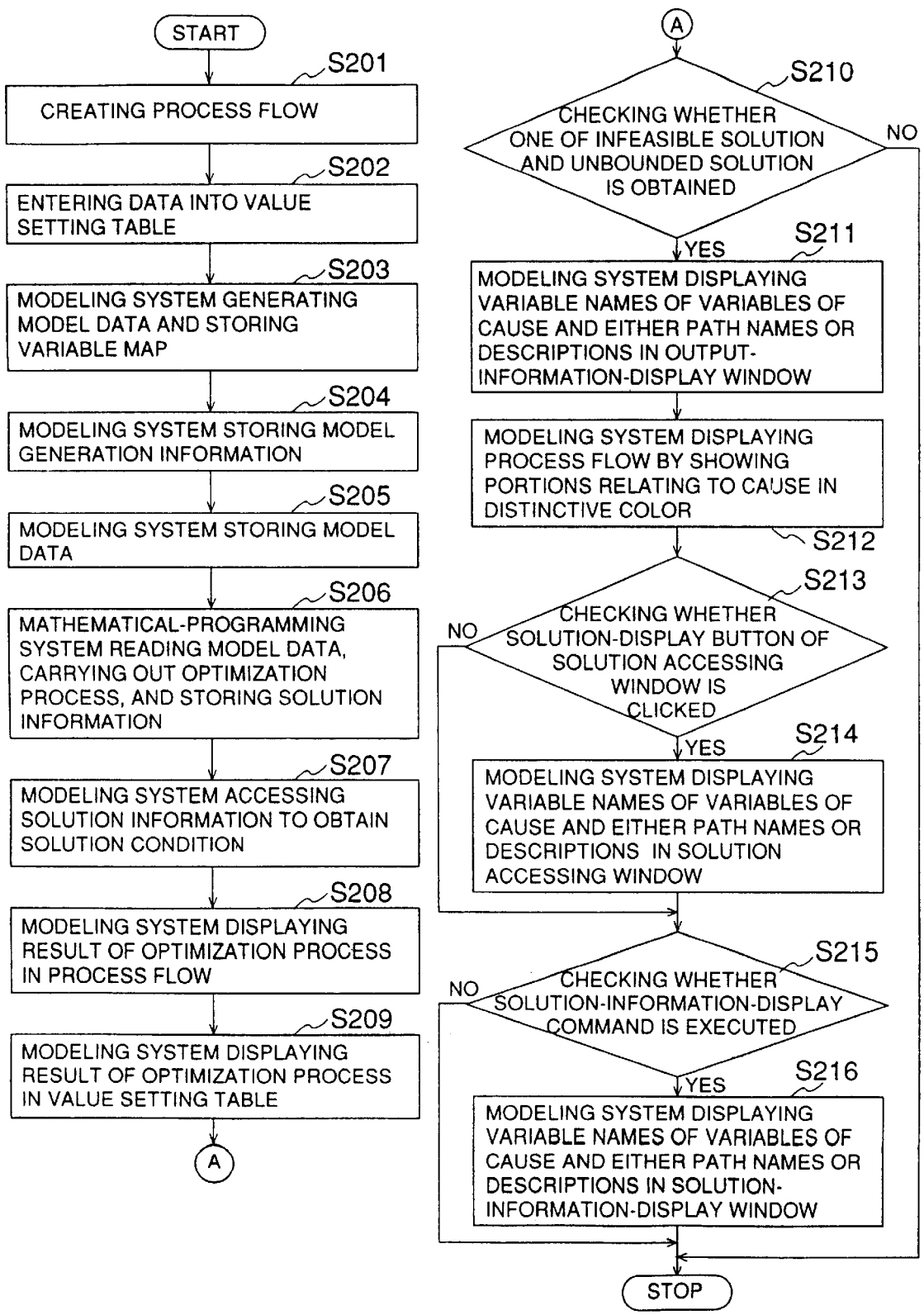
FIG. 13 is a flowchart of a process of the analysis aiding device of FIG. 11.

FIG. 13 is a flowchart of a process of the analysis aiding device of FIG. 11.

At a step S201, when the user gives an instruction through the input unit 170 to activate the modeling system 100, the process-flow generating unit 130 generates the process-flow according to the instruction, and sends it to the display device 600 via the output editing unit 150 and the output unit 160. The display device 600 displays the process-flow window 610.

At a step S202, the value-setting-table generating unit 190 generates the value setting table, according to the input information given by the user through the input unit 170, and sends it to the display device 600 via the output editing unit 150 and the output unit 160. The display device 600 displays the value setting table 650.

At a step S203, the variable-map generating unit 110 creates the variable-map file 200 by giving variable names to the data (path names) which is generated at the step S201 to represent the elements of the process-flow window 610. Also, the modeling system 100 generates the descriptions for explaining the path names which correspond to the elements of the process-flow window 610, and stores them in the message file 800.

At a step S204, the modeling system 100 stores in the model-generation-information file 900 the detailed information on the expressions and the variables regarding the generating process of the model data.

At a step S205, the model-data generating unit 120 generates the model data, and stores it in the model-data file 300.

At a step S206, the mathematical-programming system 500 reads the model data from the model-data file 300, carries out the optimization process, and stores a result in the solution-information file 400.

At a step S207, the solution-information analyzing unit 140 accesses the solution-information file 400 to obtain the solution condition of an objective function by reading the result of the optimization process of the mathematical-programming system 500.

At a step S208, the solution-information analyzing unit 140 sends a result of an analysis of the solution-information file 400 to the process-flow generating unit 130 via the output editing unit 150. Based on this result, the process-flow generating unit 130 generates the process-flow, and sends it to the display device 600 via the output editing unit 150 and the output unit 160. At this point, the output editing unit 150 edits the process flow when an infeasible solution or an unbounded solution is obtained, so that particular portions of the process flow relating the cause are displayed in a distinctive color.

At a step S209, the solution-information analyzing unit 140 sends the result of the analysis of the solution-information file 400 to the value-setting-table generating unit 190 via the output editing unit 150. Based on this result, the value-setting-table generating unit 190 generates the value setting table. When the infeasible solution or the unbounded solution is obtained, the value setting table is sent to the display device 600 via the output editing unit 150 and the output unit 160. At this point, the output editing unit 150 edits the value setting table so as to display particular portions thereof relating the cause in a distinctive color.

At a step S210, a check is made, based on the result of the analysis by the solution-information analyzing unit 140, whether the infeasible solution or the unbounded solution is included in the information of the solution-information file 400. If there is no infeasible solution or unbounded solution, the procedure ends at this point. Otherwise, the procedure proceeds to a step S211.

At the step S211, the solution-information analyzing unit 140 obtains from the solution-information file 400 the variable names of the variables causing the infeasible solution or the unbounded solution. Also, the solution-information analyzing unit 140 acquires corresponding path names from the variable-map file 200, and sends the variable names and the path names to the output editing unit 150. The output editing unit 150 edits the variable names and the path names such that they are in an appropriate format for a display on the output-information-display window 620, and sends them to the output unit 160. The output unit 160 displays the output-information-display window 620 on the display device 600.

At a step S212, the output editing unit 150 receiving from the solution-information analyzing unit 140 the path names of the variables causing the infeasible solution and the unbounded solution edits the process flow so as to display portions relating to the cause in a distinctive color. The output editing unit 150 gives an instruction to the output unit 160 to display these portions of the process-flow window 610 in the distinctive color. The output unit 160 controls the display device 600 accordingly.

At a step S213, a check is made whether a solution-display button provided in the solution accessing window 630 on the display device 600 is clicked by the user. If it is clicked, the procedure goes to a step S214. Otherwise, the procedure goes to a step S215.

At a step S214, the output editing unit 150 edits the pairs of the path names and the variable names of the cause, or edits the variable names of the cause and the descriptions of the variables for a display on the solution accessing window 630. Then, the output editing unit 150 sends them to the output unit 160. The output unit 160 displays the solution accessing window 630 on the display device 600. Here, when editing the descriptions, the output editing unit 150 acquires the descriptions from the message file 800 by using the path names as keys for search.

At a step S215, a check is made whether a solution-information-display command is entered by the user. If it is, the procedure goes to a step S216. Otherwise, the procedure ends at this point.

At a step S216, the output editing unit 150 edits the pairs of the path names and the variable names of the cause, or edits the variable names of the cause and the descriptions of the variables for a display on the solution-information-display window 640. Then, the output editing unit 150 sends them to the output unit 160. The output unit 160 displays the received information in the solution-information-display window 640 on the display device 600.

Figure 14:
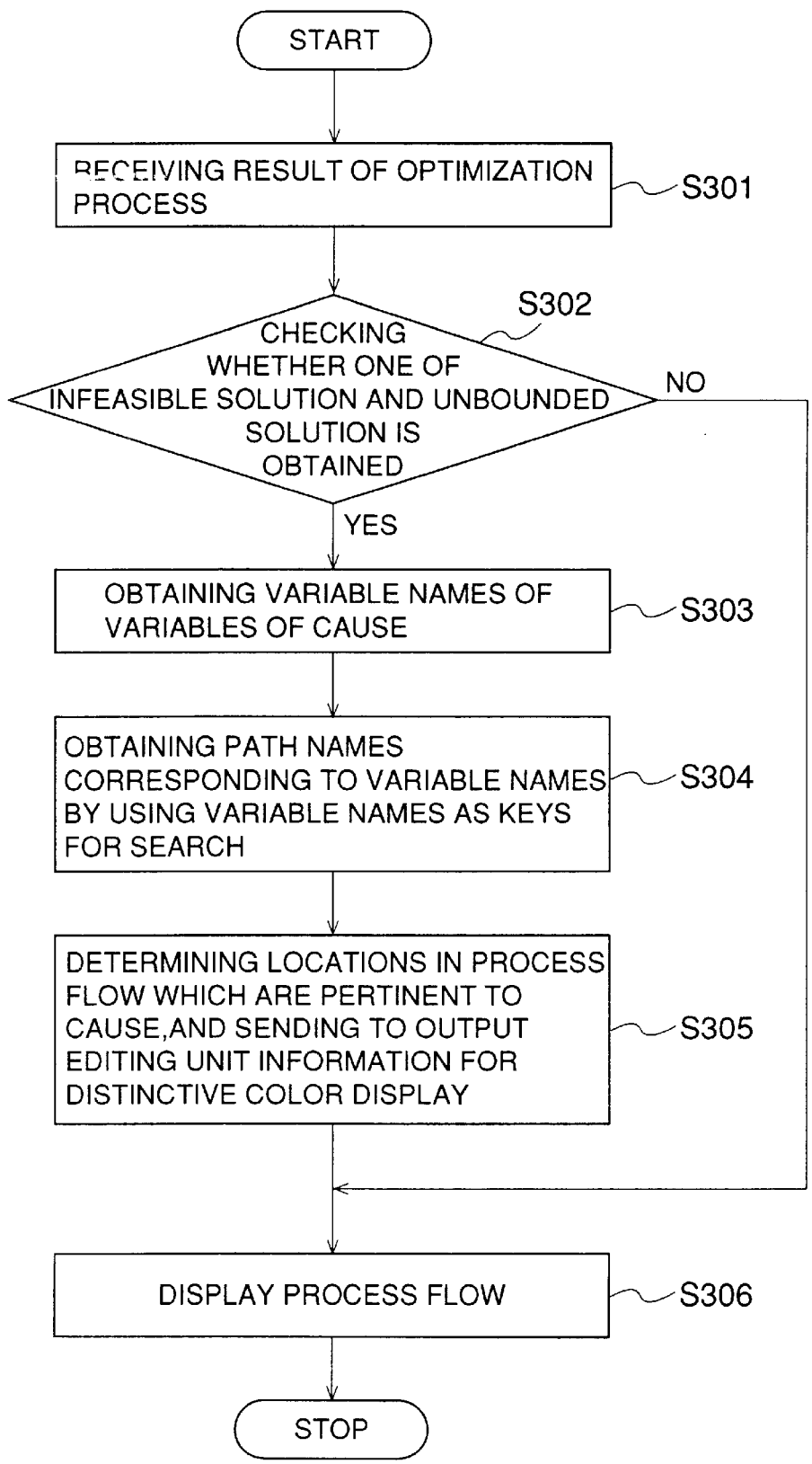
FIG. 14 is a flowchart of a process of generating a process-flow by using the analysis aiding device of FIG. 11.

FIG. 14 is a flowchart of a process of generating the process-flow according to the embodiment of the present invention. The flowchart of FIG. 14 shows the processes of the steps S207 and S208 of FIG. 13 in more detail.

At a step S301, the solution-information analyzing unit 140 receives the result of the optimization process from the solution-information file 400.

At a step S302, a check is made by the solution-information analyzing unit 140 whether the solution condition indicates an existence of an infeasible solution or an unbounded solution. If there is no infeasible solution or unbounded solution, the solution-information analyzing unit 140 instructs the output editing unit 150 not to carry out the editing process of the distinctive color display, and the procedure goes to a step S306. If there is an infeasible solution or an unbounded solution, the procedure goes to a step S303.

At the step S303, the solution-information analyzing unit 140 obtains the variable names of variables of the cause from the result of the optimization process.

At the step S304, the solution-information analyzing unit 140 obtains the path names corresponding to the variable names from the variable-map file 200 by using the variable names as keys for search.

At a step S305, the solution-information analyzing unit 140 determines locations in the process-flow window 610 which are pertinent to the cause of the infeasible solution or the unbounded solution. Then, the solution-information analyzing unit 140 sends to the output editing unit 150 these locations and information to be displayed in the distinctive color.

At a step S306, when there is no infeasible solution or unbounded solution, the output editing unit 150 edits the process flow without using the distinctive color, and instructs the output unit 160 to display the process-flow window 610. When there is an infeasible solution or an unbounded solution, the output editing unit 150 edits the process flow so as to display pertinent portions thereof in the distinctive color. Then, the output unit 160 displays the process-flow window 610 on the display device 600.

Figure 15:
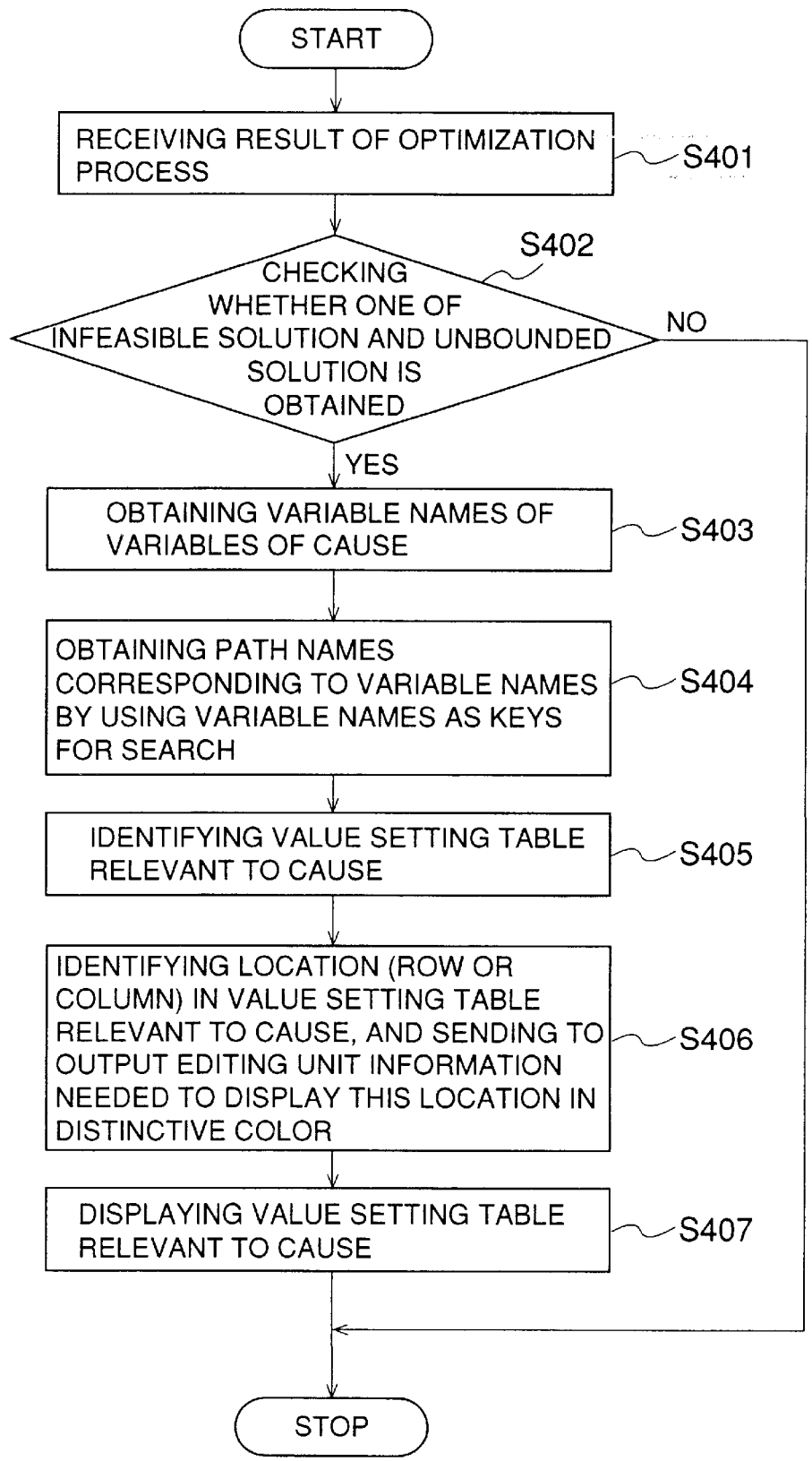
FIG. 15 is a flowchart of a process of generating a value setting table by using the analysis aiding device of FIG. 11.

FIG. 15 is a flowchart of a process of generating the value setting table according to the embodiment of the present invention. The flowchart of FIG. 15 shows the process of the step S209 of FIG. 13 in more detail.

At a step S401, the solution-information analyzing unit 140 receives the result of the optimization process from the solution-information file 400.

At a step S402, a check is made by the solution-information analyzing unit 140 whether there is an infeasible solution or an unbounded solution. If there is no infeasible solution or unbounded solution, the procedure ends at this point. If there is an infeasible solution or an unbounded solution, the procedure goes to a step S403.

At the step S403, the solution-information analyzing unit 140 obtains the variable names of the variables causing the infeasible solution or the unbounded solution from the information received at the step S401.

At a step S404, the solution-information analyzing unit 140 searches in the model-generation-information file 900 by using the variable names. This will be described later in detail.

At a step S405, the solution-information analyzing unit 140 identifies a value setting table relevant to the cause of the infeasible solution and the unbounded solution.

At a step S406, the solution-information analyzing unit 140 identifies a location (row or column) in the value setting table 650 relevant to the cause. Then, the solution-information analyzing unit 140 sends to the output editing unit 150 information needed to display this location in the distinctive color.

At a step S407, the output editing unit 150 edits the received information in a predetermined format, and sends it to the output unit 160. The output unit 160 displays on the display device 600 the value setting table 650 relevant to the cause of the infeasible solution or the unbounded solution.

The process at the step S404 of searching in the model-generation-information file 900 by using the variable names will be described below by using the example of FIG. 3.

First, the solution-information analyzing unit 140 obtains the variable "R0000014" from the information received from the solution-information file 400. Here, the variable "R0000014" is the cause of the infeasible solution or the unbounded solution.

Second, the solution-information analyzing unit 140 searches in the model-generation-information file 900 by using the variable name R0000014. As a result, the followings can be known:

the variable name R0000014 is a name of a expression which is concerned with an amount of consumption in the first period on the line L9;

the expression concerning the consumption on the line L9 is "−1.0×(value of C0000013)+1.0×(value of C0000033)= 0";

the variable C0000013 represents an output amount from devices in the first period on the line L9 with no upper bound and a lower bound of 50;

the variable C0000033 represents an output amount from the whole process flow in the first period on the line L9 with no upper bound and a lower bound of 0.

Based on these findings, the value setting table concerning the output information of a device is generated by using the path name of the variable C0000013. FIG. 16 is an illustrative drawing showing an example of the value setting table. In the example of FIG. 16, a first row for the line L9 is shown in the distinctive color.

In the following, a display and an editing on the display will be described for each of the display patterns.

1) Display of Output-Information-Display Window 620

The solution-information analyzing unit 140 obtains from the solution-information file 400 the result of the optimization process carried out by the mathematical-programming system 500, and, then, analyzes the result. A result of the analysis can be either the optimal solution, the infeasible solution, or the unbounded solution.

FIGS. 17A through 17C show examples of a display (pairs of the variable names and the path names) in the output-information-display window 620. Here, information which may be displayed in the output-information-display window 620 includes the record on the generation of the model data, information generated during the operation of the mathematical-programming system 500, and the record on the process of the modeling system 100 obtaining the solution information of the mathematical-programming system 500.

Displayed information shown in FIGS. 17A through 17C are generated by the output editing unit 150 when the solution-information analyzing unit 140 determines, based on the analysis, if there is an infeasible solution or an unbounded solution.

FIG. 17A shows an example in which an optimal solution is obtained. FIG. 17B shows an example in which the variables R0000012, R0000018, and R0000032 are the cause of an infeasible solution. FIG. 17C shows an example in which the variable C0000005 is the cause of the unbounded solution.

In FIG. 17B, information on the unbounded solution generated by the mathematical-programming system 500 is indicated by "a". In this example, there are three variables causing the infeasible solution. Information on the unbounded solution generated by the modeling system 100 is indicated by "b", and shows pairs of the variable names (indicated by "c") and the path names (indicated by "d"). Here, the variable names are given by the modeling system 100, and the path names represent which elements of the process flow correspond to the variable names. In order to display this information, the solution-information analyzing unit 140 obtains the variable names causing the infeasible solution from the solution-information file 400, and searches for the corresponding path names in the variable-map file 200 by using the variable names. Then, the solution-information analyzing unit 140 sends the obtained path names and the variable names to the output editing unit 150.

In FIG. 17C, information on the infeasible solution generated by the mathematical-programming system 500 is indicated by "e", and shows a variable number and a variable name. Information on the infeasible solution generated by the modeling system 100 is indicated by "f", and shows a pair of the variable name (indicated by "g") and the path name (indicated by "h"). Here, the variable name is given by the modeling system 100, and the path name represents which elements of the process flow correspond to the variable names. In order to display this information, the solution-information analyzing unit 140 obtains the variable names causing the unbounded solution from the solution-information file 400, and searches for the corresponding path names in the variable-map file 200 by using the variable names. Then, the solution-information analyzing unit 140 sends the obtained path names and the variable names to the output editing unit 150.

As shown in FIGS. 17A through 17C, the output unit 160 displays the information on a solution in the output-information-display window 620, after the output editing unit 150 sends the edited information to the output unit 160.

FIG. 18 is an illustrative drawing showing an example of a display (pairs of the variable names and the path names) when the process flow has a hierarchical structure.

In FIG. 18, information on an infeasible solution generated by the mathematical-programming system 500 is indicated by "a", and information on the infeasible solution generated by the modeling system 100 is indicated by "b". A variable name given by the modeling system 100 is indicated by "c", and a path name representing which elements of the process flow correspond to the variable name is indicated by "d". In order to display these pieces of information ("b" through "d"), the solution-information analyzing unit 140 obtains the variable name causing the infeasible solution from the solution-information file 400, and searches for the corresponding path name in the variable-map file 200 by using the variable name as a key. The output editing unit 150, then, edits the path name and the variable name in the format as shown in FIG. 18, and send them to the output unit 160.

FIG. 19 is an illustrative drawing showing an example of a display (pairs of the variable names and the descriptions). With reference to FIG. 19, a case will be described in which the variable names and the descriptions are displayed.

In FIG. 19, information on an infeasible solution generated by the mathematical-programming system 500 is indicated by "a". Information on the infeasible solution generated by the modeling system 100 is indicated by "b", in which a variable R0000052 (indicated by "c") is the cause of the infeasible solution. This information ("b") also provides a description (indicated by "d") as to which element of the process flow corresponds to the variable R0000052.

In order to display these pieces of information ("b" through "d"), the output editing unit 150 obtains the path name corresponding to the variable of the cause, and searches for the description in the message file 800 by using the path name as a key. Then, the output editing unit 150 edits the variable name and the description in the format as shown in FIG. 19. The output unit 160 displays in the output-information-display window 620 the variable name and the description which are sent from the output editing unit 150.

In the example of FIG. 19, the solution-information analyzing unit 140 obtains from the variable-map file 200 the path name ".C.CB.CONSUME(LC3).T(1)", which corresponds to the variable R0000052. Then, this path name is sent to the output editing unit 150. By using this path name, the output editing unit 150 searches for a description in the message file 800. After obtaining a description "Consumption amount in the first period on the line LC3 of the third layer, which belongs to a box CB of the second layer, which belongs to a box C of the first layer", the output editing unit 150 edits the variable name and the description in a format appropriate for the display, and sends them to the output unit 160. Then, the output unit 160 displays the output-information-display window 620 as shown in FIG. 19.

In an editing of other display windows, descriptions of the path names are edited in the same manner as the description of the variable names described above.

2) Display of the Process Flow 610

When an infeasible solution or an unbounded solution is obtained through the optimization process of the mathematical-programming system 500, the output unit 160 displays portions of the process-flow in a distinctive color so as to indicate the variables causing the infeasible solution or the unbounded solution.

Information regarding coordinates within the process flow is managed by the process-flow generating unit 130. Thus, the solution-information analyzing unit 140 sends a result of an analysis of the infeasible solution or the unbounded solution to the process-flow generating unit 130 via the output editing unit 150. Based on this result, the process-flow generating unit 130 determines locations of the portions to be displayed in the distinctive color, and sends these locations to the output editing unit 150. Then, the output unit 160 displays elements in these locations in the distinctive color on the display device 600.

Figure 20:
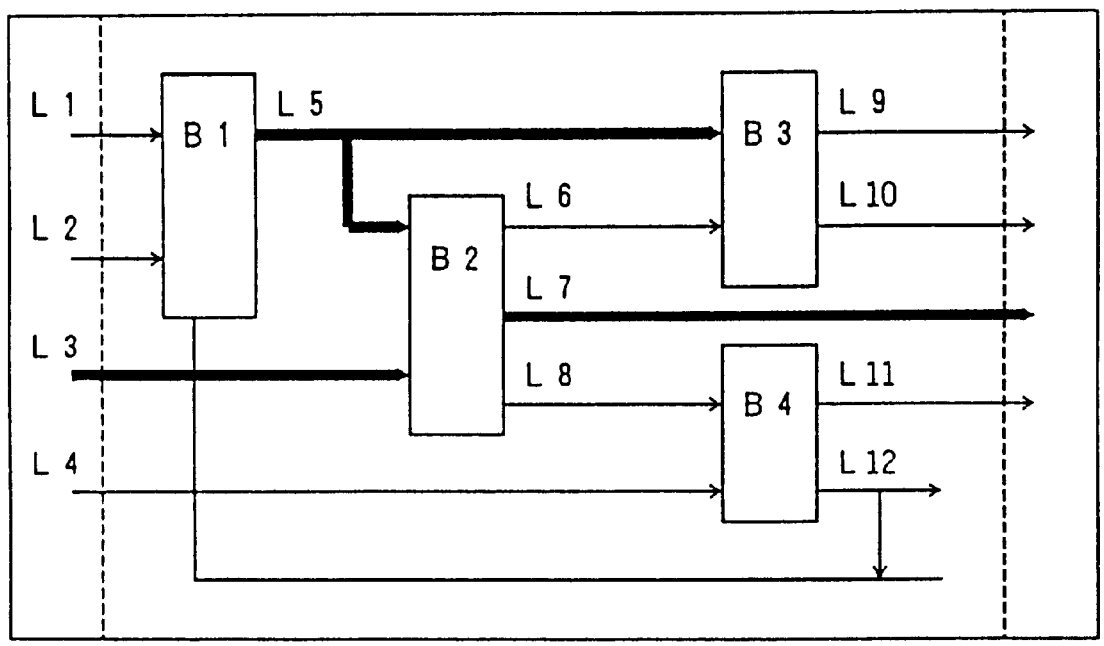
FIG. 20 is an illustrative drawing showing an example of a display on a process-flow window of FIG. 11.

FIG. 20 is an illustrative drawing showing an example of a display on the process-flow window 610 according to the embodiment of the present invention. In the example of the figure, it is shown that a line L3, a line L5, and a line L7 are the cause of an infeasible solution, wherein these lines are identified based on the path names of the variables causing the infeasible solution. The lines L3, L5, and L7 are displayed in a distinctive color. For example, if other lines on the display are shown in a black color, the lines L3, L5, and L7 are displayed in other colors than the black color such as green, blue, etc. When the display device does not have a function for providing a color display, the lines L3, L5, and L7 can be shown in a blinking or flashing manner.

Figure 21:
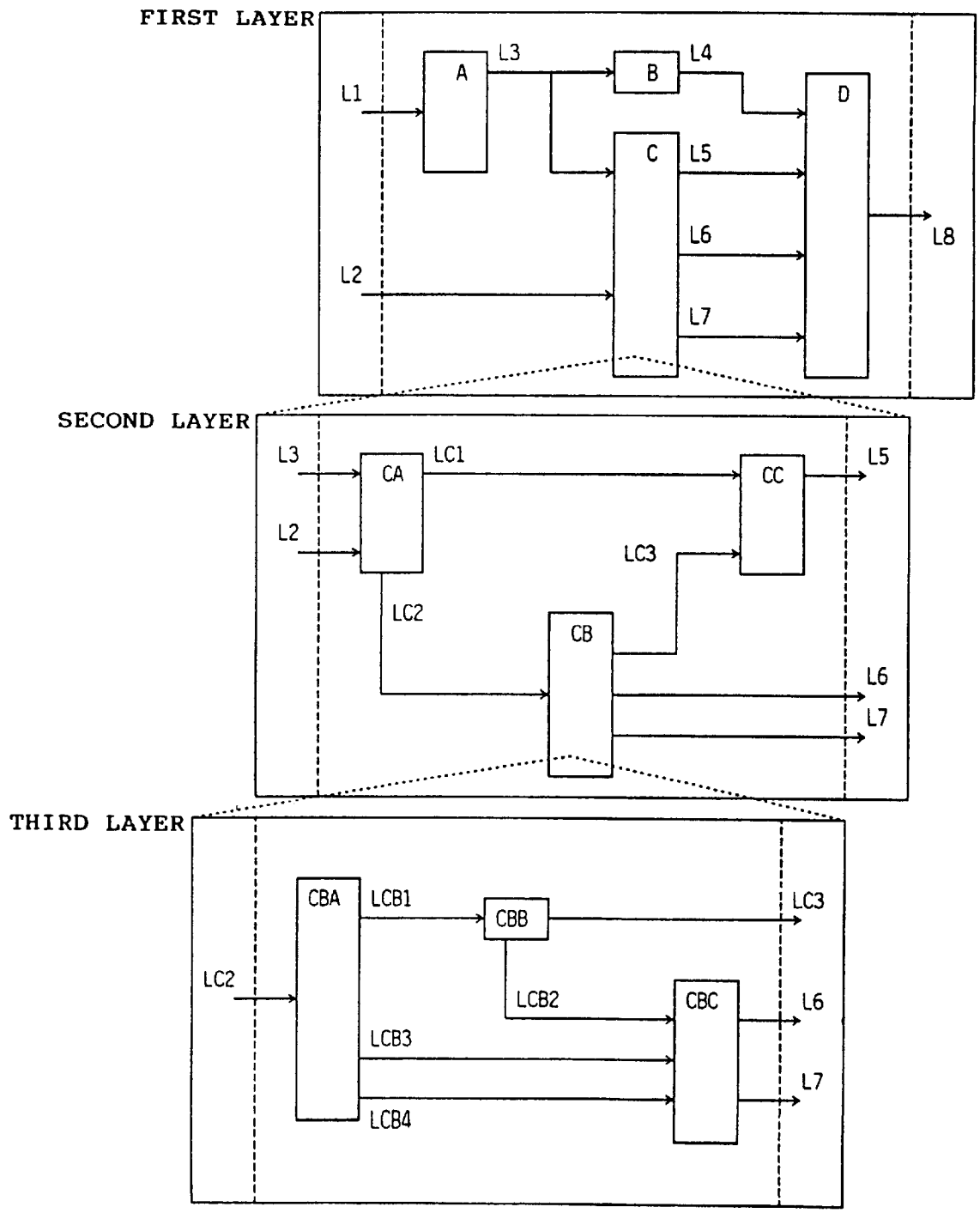
FIG. 21 is an illustrative drawing showing an example of a process flow which has a hierarchical structure.
Figure 22:
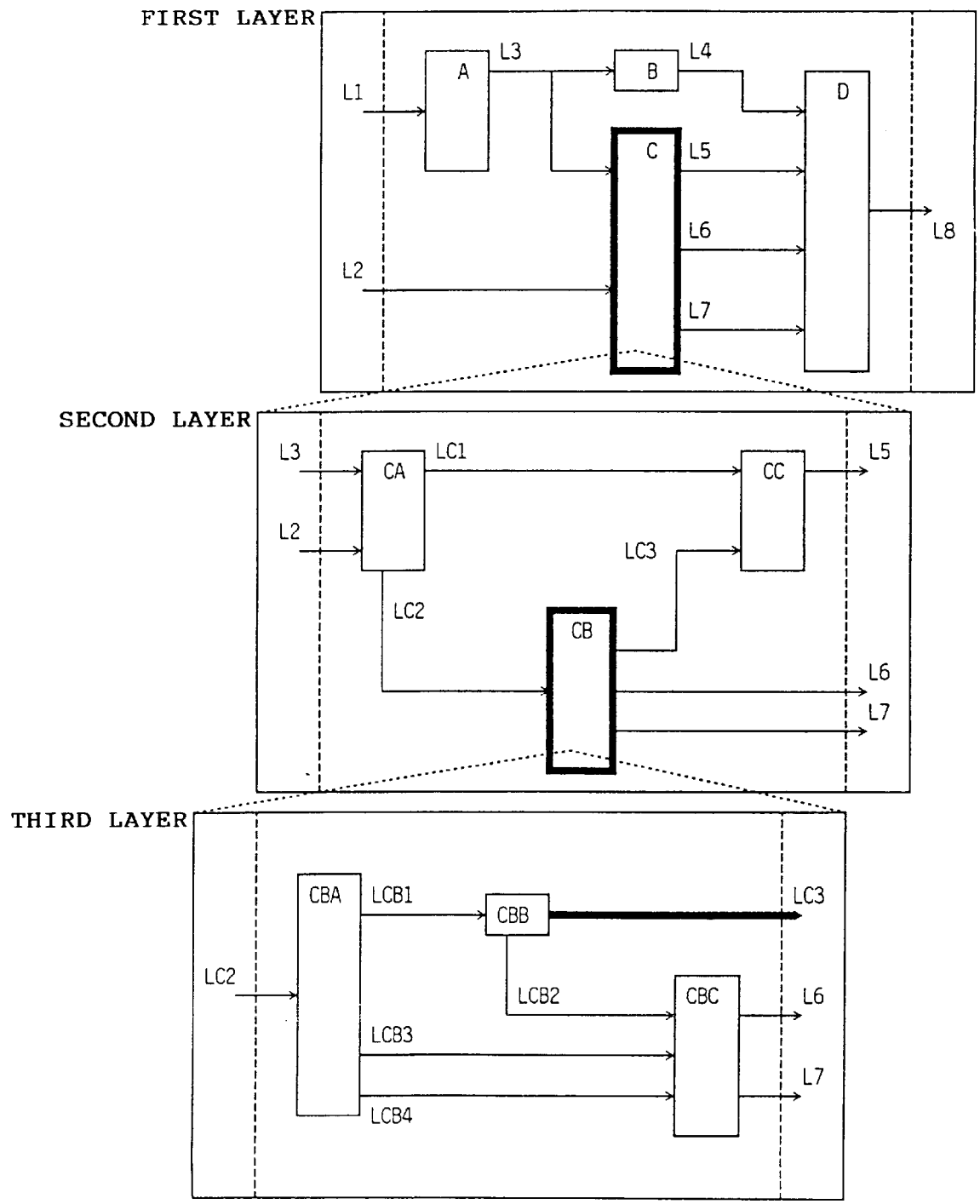
FIG. 22 is an illustrative drawing showing an example of a display in the process-flow window when the process flow has a hierarchical structure.

When the process flow has a hierarchical structure, the process flow is displayed such that the cause of an infeasible solution or an unbounded solution can be tracked down from the uppermost layer of the hierarchy to lower layers. FIG. 21 is an illustrative drawing showing an example of a process flow which has a hierarchical structure. In the example of FIG. 21, the process flow has three layers from a first layer to a third layer. FIG. 22 is an illustrative drawing showing an example of a display in the process-flow window 610, and shows a case in which an infeasible solution or an unbounded solution exists in the lowest level of a hierarchical structure of the process flow. In FIG. 22, arrows represent flows of elements, and boxes represent devices for processing the elements.

The example of FIG. 22 shows that an infeasible solution or an unbounded solution is caused by data on a line LC3 of the third layer, which line LC3 belongs a box CB of the second layer, which box CB belongs to a box C of the first layer. Pieces of information relating to this configuration have appeared in FIG. 18 as the path name ".C.CB.CONSUME(LC3).T(1)" and in FIG. 19 as the description "Consumption amount in the first period on the line LC3 of the third layer, which belongs to a box CB of the second layer, which belongs to a box C of the first layer".

In the example of FIG. 22, the cause of the infeasible solution or the unbounded solution is found on the line LC3 belonging to the third layer. The process flow is tracked down from the uppermost layer to the lower layers. Thus, the first layer is first shown with the box C in the distinctive color. Then, the second layer belonging to the box C is shown with the box CB in the distinctive color. Finally, the third layer belonging to the box CB is shown with the line LC3 in the distinctive color.

3) Display of Solution Accessing Window 630

When an infeasible solution or an unbounded solution is obtained through the optimization process of the mathematical-programming system 500, the pairs of the variable names and the path names relevant to the cause are displayed in the solution accessing window 630 by using the solution-display button. Here, the path names indicates which elements of the process flow correspond to the variables causing the infeasible solution or the unbounded solution.

FIGS. 23A and 23B are illustrative drawings showing examples of a display on the solution accessing window 630 according to the embodiment of the present invention. In the figures, variables R0000012, R0000018, and R0000032 are assumed to be the cause of an infeasible solution.

When a solution-display button 631 in a window of FIG. 23A is clicked, a window of FIG. 23B is displayed. In the window of FIG. 23A are shown pairs of the variable names and the path names which are edited in the appropriate format by the output editing unit 150. For editing, the output editing unit 150 accesses the solution-information file 400 to obtain the result of the optimization process of the mathematical-programming system 500.

When the user clicks the solution-display button 631, the solution-information analyzing unit 140 accesses the solution-information file 400 to obtain the variables names R0000012, R0000018, and R0000032, which are the cause of the infeasible solution. Then, the solution-information analyzing unit 140 searches in the variable-map file 200 by using the variable names as keys for the search, and obtains corresponding path names. The variable names and the path names are sent to the output editing unit 150. The output editing unit 150 edits the variable names and the path names in the format shown in FIG. 23B, and sends them to the output unit 160.

In this manner, the solution accessing window 630 displays at an initial stage the result of the optimization process obtained from the solution-information file 400. Then, the information on the infeasible solution or the unbounded solution is displayed when the solution-display button 631 is clicked.

Figure 24A:
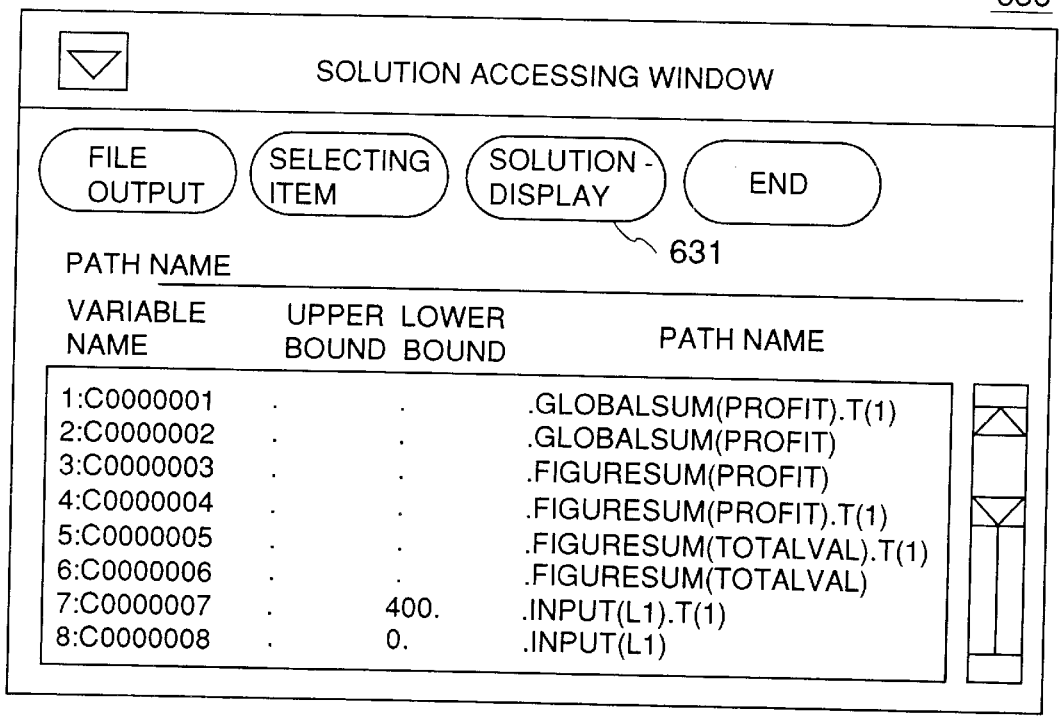
FIGS. 24A and 24B are illustrative drawings showing other examples of a display on the solution accessing window.
Figure 24B:
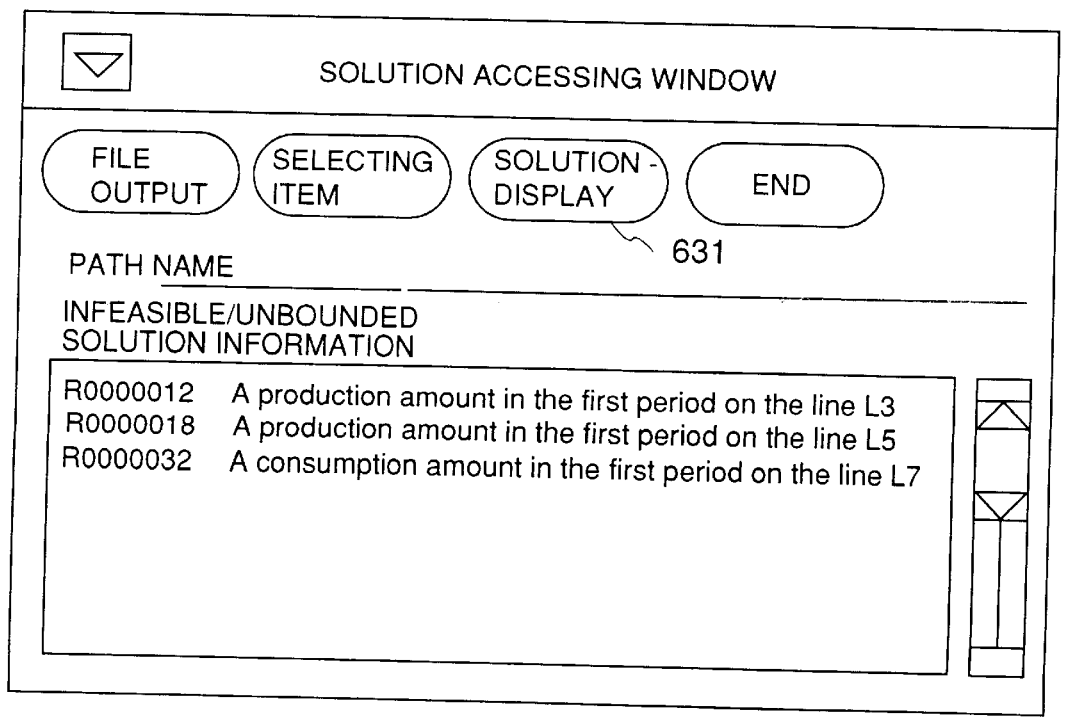

FIGS. 24A and 24B are illustrative drawings showing other examples of a display on the solution accessing window 630 according to the embodiment of the present invention. FIG. 24A is the same as the FIG. 23A. A window of FIG. 23B is displayed when the solution-display button 631 is clicked by the user in the window of FIG. 23A. Upon the click, the solution-information analyzing unit 140 obtains the variable names of the variables causing an infeasible solution or an unbounded solution, and, then, obtains the path names from the variable-map file 200 by using the variable names as keys. The variable names and the path names are handed to the output editing unit 150. The output editing unit 150 accesses the message file 800 to obtain the descriptions corresponding to the path names. Then, the output editing unit 150 edits the variable names and the descriptions in the format shown in FIG. 24B, and sends them to the output unit 160.

For example, when the path name of the variable R0000012 is ".PRODUCT(L3).T1", the description obtained from the message file 800 is "A production amount in the first period on the line L3". Thus, output unit 160 displays this variable name and this description in the solution accessing window 630 which is switched from the window of the initial state.

4) Display of the Solution-Information-Display Window 640

When an infeasible solution or an unbounded solution is obtained through the optimization process of the mathematical-programming system 500, the pairs of the variable names of the variables causing the infeasible solution or the unbounded solution and the path names representing which elements of the process flow correspond to these variables are displayed in the solution-information-display window 640.

Figure 25:
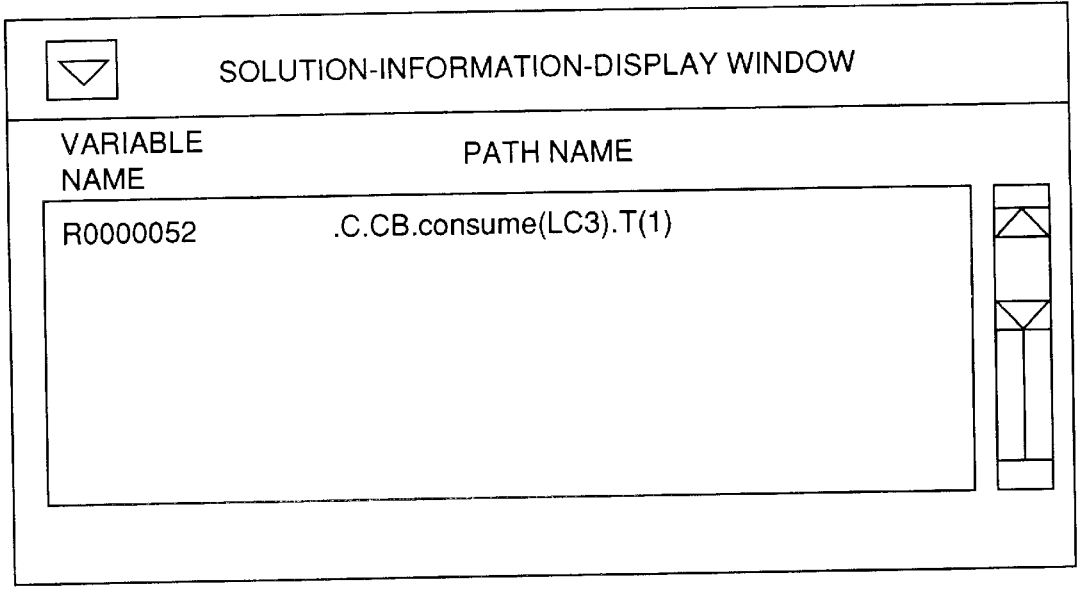
FIG. 25 is an illustrative drawing showing an example of a display on a solution-information-display window of FIG. 11.

FIG. 25 is an illustrative drawing showing an example of a display on the solution-information-display window 640.

In the figure, the variable R0000052 is a cause of an infeasible solution.

The solution-information analyzing unit 140 accesses the solution-information file 400 to obtain the variable name of the variable causing the infeasible solution, and, also, obtains a corresponding path name from the variable-map file 200. The variable name and the path name are sent to the output editing unit 150. The output editing unit 150 edits the pair of the variable name and the path name in the format shown in FIG. 25, and send it to the output unit 160.

In the example of FIG. 25, the solution-information analyzing unit 140 obtains the variable name R0000052 of the variable causing the infeasible solution, and, also, obtains the path name ".C.CB.CONSUME(LC3).T(1)" from the variable-map file 200 by using the variable name R0000052. The variable name R0000052 and the path name ".C.CB.CONSUME(LC3).T(1)" are sent to the output editing unit 150. The output editing unit 150 edits these names in the format of the solution-information-display window 640 as shown in FIG. 25, and sends them to the output unit 160. Then, the output unit 160 displays the variable name and the path name.

Figure 26:
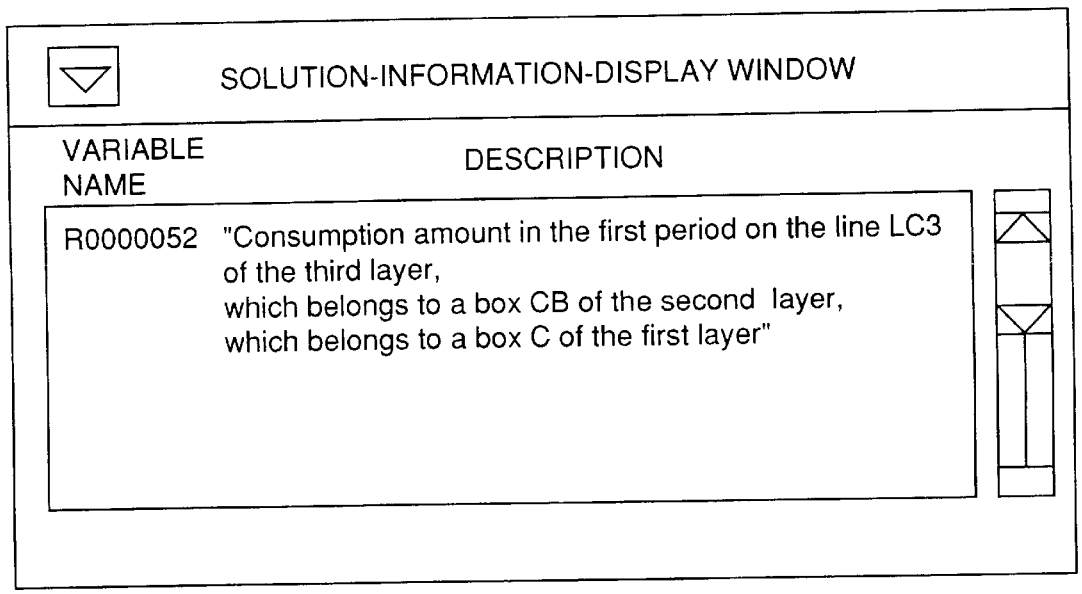
FIG. 26 is an illustrative drawing showing another example of a display (the variable name and the description) on the solution-information-display window.

FIG. 26 is an illustrative drawing showing another example of a display (the variable name and the description) on the solution-information-display window 640. With reference to FIG. 26, a case in which the variable names and the descriptions of the variables causing an infeasible solution or an unbounded solution will be described. In FIG. 26, the variable R0000052 is a cause of an infeasible solution.

The solution-information analyzing unit 140 accesses the solution-information file 400 to obtain the variable name of the variable causing the infeasible solution, and, also, obtains a corresponding path name from the variable-map file 200. The variable name and the path name are sent to the output editing unit 150. The output editing unit 150 searches in the message file 800 by using the path name to obtain a corresponding description. Then, the output editing unit 150 edits the pair of the variable name and the description in the format shown in FIG. 26.

In the example of FIG. 26, the solution-information analyzing unit 140 obtains the variable name R0000052 of the variable causing the infeasible solution, and, then, obtains the path name ".C.CB.CONSUME(LC3).T(1)" from the variable-map file 200 by using the variable name R0000052. The variable name R0000052 and the path name ".C.CB.CONSUME(LC3).T(1)" are sent to the output editing unit 150. The output editing unit 150 searches in the message file 800 by using the path name ".C.CB.CONSUME(LC3).T(1)" to obtain a description "Consumption amount in the first period on the line LC3 of the third layer, which belongs to a box CB of the second layer, which belongs to a box C of the first layer". Then, the output editing unit 150 edits the variable name and the description in the format of the solution-information-display window 640, and sends them to the output unit 160.

Then, the output unit 160 displays the variable name and the path name.

Figure 27:
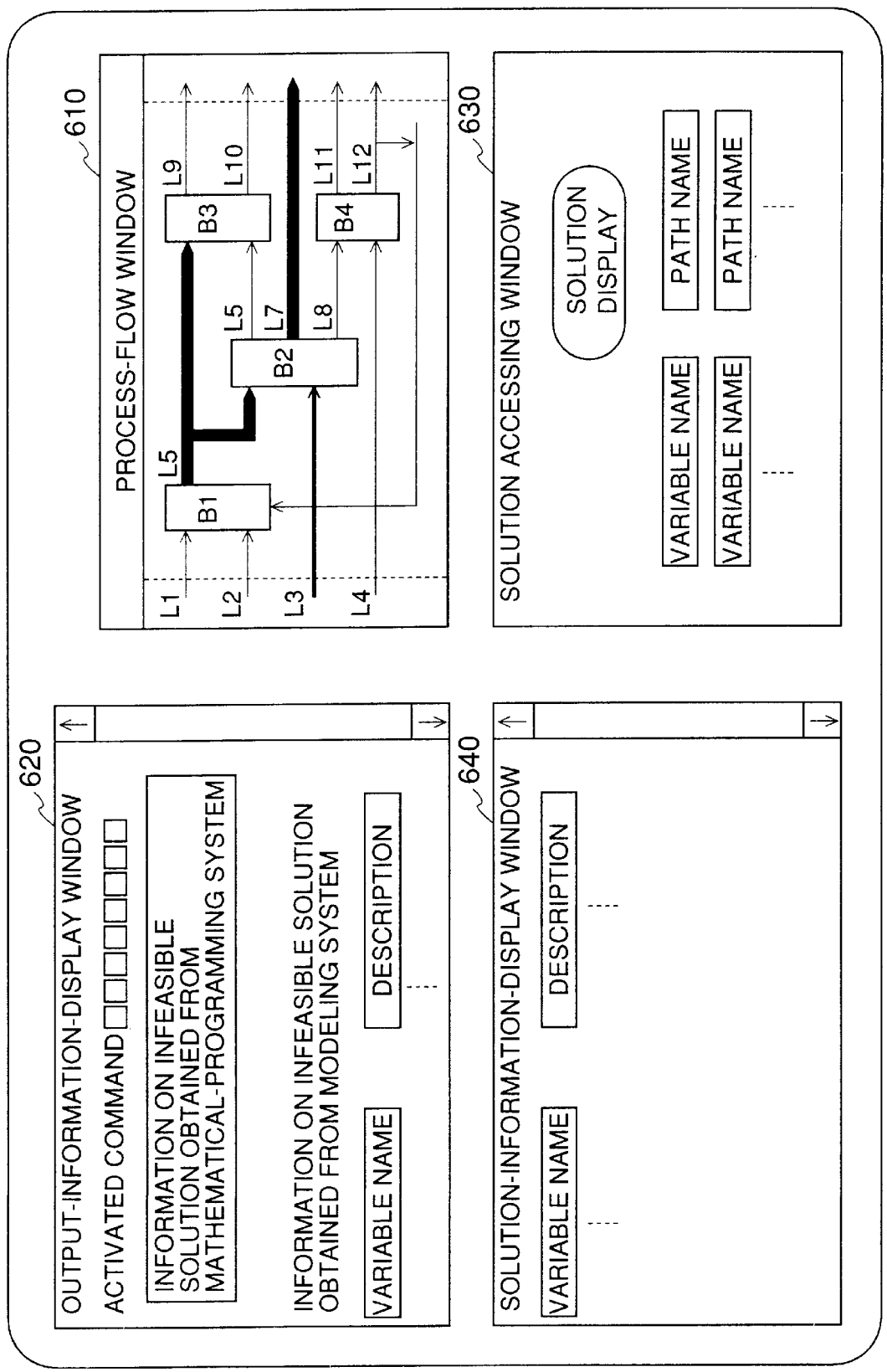
FIG. 27 is an illustrative drawing showing an example of a display on a display device of FIG. 11.

FIG. 27 is an illustrative drawing showing an example of a display on the display device 600 according to the embodiment of the present invention. As shown in FIG. 27, in the embodiment of the present invention, information useful for analyzing a cause of an infeasible solution or an unbounded solution is edited in appropriate formats to be displayed in various windows on the display.

5) Simultaneous Display of the Process-Flow Window 610 and the Value Setting Table 650

Figure 28:
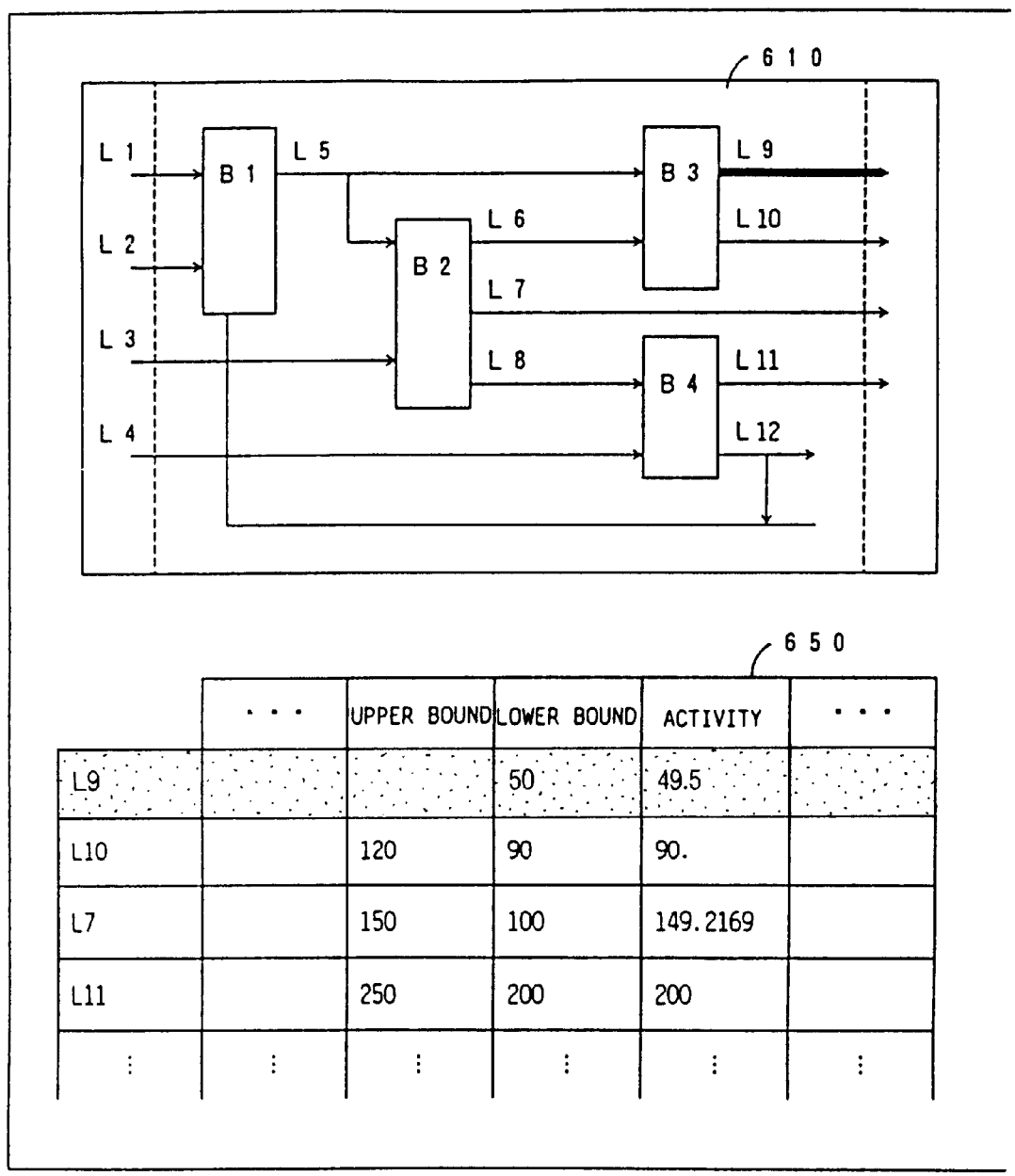
FIG. 28 is an illustrative drawing showing an example in which the process flow and the value setting table are displayed simultaneously.

FIG. 28 is an illustrative drawing showing an example in which the process flow and the value setting table are displayed simultaneously according to the embodiment of the present invention. In the example of FIG. 28, the line L9 in the process-flow window 610 shown at the top is displayed in a distinctive color, and, at the same time, a row of the line L9 of the value setting table 650 shown at the bottom is also displayed in a distinctive color.

In this example, a cause of an infeasible solution is found in the element L9 of the process-flow window 610, which is generated by the user using the modeling system 100. Also, in FIG. 28, the line L9 in the process-flow window 610 and the row of the line L9 in the value setting table 650 may be displayed in the same distinctive color, so that a connection between these two is quite clear.

The above description of the embodiment has been provided by taking a particular example in which the variable-map generating unit 110 generates the message file 800 at the same time as generating the variable-map file 200. However, the present invention is not limited to this example, and, for example, the message file 800 may be generated when the user creates the process flow.

As described above, according to the present invention, information on an infeasible solution or an unbounded solution is given to the user by displaying in a distinctive appearance the elements of the cause in the process flow, which is created by the user. Thus, the user can start an analysis of the cause with the information, the meaning of which is easy to grasp for the user.

Also, according to the present invention, the pairs of the variable names and the path names relevant to the cause or the pairs of the variable names and the descriptions relevant to the cause are displayed in various display windows on one display, such as output-information-display window, the solution accessing window, and the solution-information-display window. Thus, without making a search in the variable-map file and the like, the user can study the cause of the infeasible solution or the unbounded solution in detail.

Also, according to the present invention, the process flow and the value setting table are displayed in association with each other. Thus, the user can identify the locations in the process flow of the elements causing the infeasible solution or the unbounded solution, and, at the same time, can know the value associated with the elements in the value setting table. Also, the same distinctive color may be used in the process flow and in the value setting table to display the cause of the infeasible solution and the unbounded solution. Thus, associations between the process flow and the value setting table are easy to recognize.

Further, the present invention is not limited to these embodiments, but other variations and modifications may be made without departing from the scope of the present invention.

What is claimed is:

1. A device for aiding an analysis of a cause of one of an infeasible solution and an unbounded solution when mathematical programming fails to find an optimal solution for a model, said device comprising:

a display unit having a display on which a process flow is created by a user determining a configuration of elements for said model; and output means for producing said process flow display on said display unit such that at least one of said elements causing said one of an infeasible solution and an unbounded solution is distinctive from remaining ones of said elements, wherein said at least one of said elements is identified from a path name thereof, said path name being obtained from a variable name reported in a result of said mathematical programming, said path name corresponding to a process flow path in said process flow.

2. The device as claimed in claim 1, wherein said output means produces a display of said at least one of said elements in a distinctive color.

3. The device as claimed in claim 1, wherein conditions for said elements are set by said user in a value setting table on said display, and wherein said output means comprises first output means for producing a display of said value setting table such that said at least one of said elements is distinctive from said remaining ones of said elements.

4. The device as claimed in claim 3, wherein said first output means produces the display of said at least one of said elements in a distinctive color.

5. The device as claimed in claim 3, wherein said first output means produces the display of said value setting table simultaneously with the display of said process flow on said display.

6. The device as claimed in claim 1, wherein said output means produces a flashing display of said at least one of said elements.

7. The device as claimed in claim 1, wherein said process flow has a hierarchical structure and said output means comprises a second output means for producing a distinctive display of said at least one of said elements and of portions which include said at least one of said elements at upper levels of said hierarchical structure.

8. The device as claimed in claim 7, wherein said second output means produces the display of said at least one of said elements and said portions in at least one distinctive color.

9. The device as claimed in claim 7, wherein said second output means produces flashing display of said at least one of said elements and said portions.

10. The device as claimed in claim 1, wherein said output means comprises a third output means for producing a display of said variable name corresponding to said at least one of said elements and of at least one of said path name of said variable name and a description of said path name, said path name representing which element corresponds to said variable name.

11. The device as claimed in claim 1, wherein said output means comprises fourth output means for producing a display of said variable name corresponding to said at least one of said elements and said path name of said variable name in a first window of a first mode on said display unit, and of said variable name and a description of said path name in said first window of a second mode on said display unit, said path name representing which element corresponds to said variable name and said first window being switched between said first mode and said second mode by an instruction from said user.

12. The device as claimed in claim 1, further comprising: process-flow-generation means for providing a user interface for a creation of said process flow and for storing said process flow;

variable-element-information storage means for storing pairs of variable names of said elements and path names of said variable names, said path names representing which elements correspond to said variable names; and solution storage means for storing a result of said mathematical programming, wherein said output means further comprises editing means for obtaining said variable name of said at least one of said elements from said solution storage means, for searching in said variable-element-information storage means by using said variable name to obtain said path name of said variable name, and for editing said process flow to display said at least one of said elements distinctively from said remaining ones of said elements.

13. The device as claimed in claim 12, wherein said editing means edits said variable name and said path name in a predetermined format to be displayed on said display unit.

14. The device as claimed in claim 12, further comprising message storage means for storing descriptions of said path names, wherein said editing means further comprises message editing means for searching in said message storage means by using one of said path name and said variable name to obtain a description of said path name and for editing said variable name and said description in a predetermined format to be displayed on said display.

15. The device as claimed in claim 14, further comprising means for generating said descriptions for each of said path names.

16. The device as claimed in claim 1, wherein the process flow created on said display unit represents at least one of a manufacturing process and a distribution process.

17. A device for aiding an analysis of a cause of one of an infeasible solution and an unbounded solution when mathematical programming fails to find an optimal solution for a model, said device comprising:

a display unit displaying a process flow, created by a user, determining a configuration of elements for said model; and an output unit producing said process flow display on said display unit such that at least one of said elements, causing said one of an infeasible solution and an unbounded solution, is distinctive from remaining ones of said elements, said at least one of said elements being identified from a path name thereof obtained front a variable name reported in a result of said mathematical programming, said path name corresponding to a process flow path in said process flow.

18. The device as claimed in claim 17, wherein said output unit produces the display of said at least one of said elements in a distinctive color.

19. The device as claimed in claim 17, wherein conditions for said elements are set by said user in a value setting table on said display, and wherein said output unit comprises a first output device producing a display of said value setting table such that said at least one of said elements is distinctive from said remaining ones of said elements.

20. The device as claimed in claim 19, wherein said first output device produces a display of said at least one of said elements in a distinctive color.

21. The device as claimed in claim 19, wherein said first output device produces a display of said value setting table simultaneously with the display of said process flow on said display unit.

22. The device as claimed in claim 18, wherein said process flow has a hierarchical structure and said output unit comprises a second output device producing a distinctive display of said at least one of said elements and of portions which include said at least one of said elements at upper levels of said hierarchical structure.

23. The device as claimed in claim 22, wherein said second output device produces the display of said at least one of said elements and said portions in at least one distinctive color.

24. The device as claimed in claim 22, wherein said second output unit produces a flashing display of said at least one of said elements and said portions.

25. The device as claimed in claim 22, wherein said output unit comprises a third output device producing a display of said variable name corresponding to said at least one of said elements and of at least one of said path name of said variable name and a description of said path name, said path name representing which element corresponds to said variable name.

26. The device as claimed in claim 25, wherein said output unit comprises a fourth output device producing a display of said variable name corresponding to said at least one of said elements and said path name of said variable name in a first window of a first mode on said display unit, and of said variable name and a description of said path name in said first window of a second mode on said display unit, said path name representing which element corresponds to said variable name and said first window being switched between said first mode and said second mode by an instruction from said user.

27. The device as claimed in claim 17, wherein said output unit produces a flashing display of said at least one of said elements.

28. The device as claimed in claim 17, further comprising:
a process-flow-generation unit providing a user interface for creation of said process flow and storing said process flow;
a variable-element-information storage unit storing pairs of variable names of said elements and path names of said variable names, said path names representing which elements correspond to said variable names; and
a solution storage unit storing a result of said mathematical programming,
wherein said output unit further comprises an editing device obtaining said variable name of said at least one of said elements from said solution storage unit, for searching in said variable-element-information storage unit by using said variable name to obtain said path name of said variable name, and for editing said process flow to display said at least one of said elements distinctively from said remaining ones of said elements.

29. The device as claimed in claim 28, wherein said editing unit edits said variable name and said path name in a predetermined format to be displayed on said display unit.

30. The device as claimed in claim 28, further comprising a message storage unit storing descriptions of said path names, wherein said editing unit further comprises message editing unit searching in said message storage means by using one of said path name and said variable name to obtain a description of said path name and editing said variable name and said description in a predetermined format to be displayed on said display.

31. The device as claimed in claim 30, further comprising a generator generating said descriptions for each of said path names.

32. A method for aiding an analysis of a cause of one of an infeasible solution and an unbounded solution when mathematical programming fails to find an optimal solution for a model, said method comprising:
displaying a process flow, created by a user, determining a configuration of elements for said model; and
producing the display of said process flow such that at least one of said elements, causing said one of an infeasible solution and an unbounded solution, is distinctive from remaining ones of said elements, said at least one of said elements being identified from a path name thereof obtained from a variable name reported in a result of said mathematical programming, said path name corresponding to a process flow path in said process flow.

33. The method as claimed in claim 32, further comprising producing the display of said at least one of said elements in a distinctive color.

34. The method as claimed in claim 32, wherein conditions for said elements are set by said user in a value setting table on said display, and wherein said method further comprises producing the display of said value setting table such that said at least one of said elements is distinctive from said remaining ones of said elements.

35. The method as claimed in claim 34, further comprising producing the display of said at least one of said elements in a distinctive color.

36. The method as claimed in claim 34, further comprising producing the display of said value setting table simultaneously with displaying said process flow.

37. The method as claimed in claim 32, further comprising producing a flashing display of said at least one of said elements.

38. The method as claimed in claim 32, wherein said process flow has a hierarchical structure and said method further comprises producing a distinctive display of said at least one of said elements and of portions which include said at least one of said elements at upper levels of said hierarchical structure.

39. The method as claimed in claim 38, further comprising producing the display of said at least one of said elements and said portions in at least one distinctive color.

40. The method as claimed in claim 38, further comprising producing a flashing display of said at least one of said elements and said portions.

41. The method as claimed in claim 32, further comprising producing a display of said variable name corresponding to said at least one of said elements and of at least one of said path name of said variable name and a description of said path name, said path name representing which element corresponds to said variable name.

42. The method as claimed in claim 32, further comprising producing a display of said variable name corresponding to said at least one of said elements and said path name of said variable name in a first window of a first mode, and of said variable name and a description of said path name in said first window of a second mode, said path name representing which element corresponds to said variable name and said first window being switched between said first mode and said second mode by an instruction from said user.

43. The method as claimed in claim 32, further comprising:
providing a user interface for creating said process flow and for storing said process flow;
storing pairs of variable names of said elements and path names of said variable names in a variable-element-information storage unit, said path names representing which elements correspond to said variable names;
storing a result of said mathematical programming in a solution storage unit; and
obtaining said variable name of said at least one of said elements from said solution storage unit for searching in said variable-element-information storage unit, by using said variable name to obtain said path name of said variable name, and editing said process flow to display said at least one of said elements distinctively from said remaining ones of said elements.

44. The method as claimed in claim 43, wherein said editing means edits said variable name and said path name in a predetermined format for said display thereof.

45. The method as claimed in claim 43, further comprising storing descriptions of said path names in a message storage unit, searching in said message storage means by using one of said path name and said variable name to obtain a description of said path name and editing said variable name and said description in a predetermined format to be displayed on said display.

46. The method as claimed in claim 45, further comprising generating said descriptions for each of said path names.

47. The device as claimed in claim 46, wherein the distribution process includes transport of respective payloads between a plurality of source points and a plurality of destination points.

\* \* \* \* \*